US007676868B2

(12) United States Patent
Reckelhoff

(10) Patent No.: US 7,676,868 B2
(45) Date of Patent: Mar. 16, 2010

(54) BIRTHING BED FOOT SUPPORT RELEASE HANDLE

(75) Inventor: Jerome E. Reckelhoff, Blue Ash, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 183 days.

(21) Appl. No.: 11/560,330

(22) Filed: Nov. 15, 2006

(65) Prior Publication Data

US 2007/0113345 A1 May 24, 2007

Related U.S. Application Data

(60) Provisional application No. 60/737,820, filed on Nov. 17, 2005, provisional application No. 60/803,841, filed on Jun. 2, 2006.

(51) Int. Cl.
*A47B 7/00* (2006.01)
*A47B 13/00* (2006.01)
*A47B 7/02* (2006.01)
*F16H 53/00* (2006.01)

(52) U.S. Cl. .................................. 5/624; 5/602; 74/567

(58) Field of Classification Search ..................... 5/602, 5/624, 600, 619; 74/557, 528, 473.1, 551.1–551.8, 74/500.5–501.6, 567

See application file for complete search history.

(56) References Cited

U.S. PATENT DOCUMENTS

| | | | |
|---|---|---|---|
| 964,170 | A | 7/1910 | Leonard |
| 2,021,107 | A | 11/1935 | Logie |
| 2,067,891 | A | 1/1937 | Comper |
| 2,120,732 | A | 6/1938 | Comper et al. |
| 2,257,491 | A | 9/1941 | Armstrong |
| 2,275,973 | A | 3/1942 | Marchbanks |
| 2,290,191 | A | 7/1942 | Karlson |
| 2,306,031 | A | 12/1942 | Anderson et al. |
| 2,381,633 | A | 7/1945 | Young |
| 2,605,151 | A | 7/1952 | Shampaine |
| 2,658,211 | A | 11/1953 | Bendersky |
| 2,757,058 | A | 7/1956 | Brosesel |
| 2,766,463 | A | 10/1956 | Bendersky |
| 2,832,655 | A | 4/1958 | Adolphson |

(Continued)

FOREIGN PATENT DOCUMENTS

DE 1 098 671 2/1961

(Continued)

OTHER PUBLICATIONS

Hill-Rom, Inc., "The Affinity.TM. Bed From Hill-Rom", 1992, 12 pgs.

(Continued)

*Primary Examiner*—Peter M Cuomo
*Assistant Examiner*—Jonathan J Liu
(74) *Attorney, Agent, or Firm*—Barnes & Thornburg LLP

(57) ABSTRACT

A limb support coupled to a patient-support apparatus comprises a frame having a pair of locks to block vertical and horizontal pivoting of the limb support in relation to the patient-support apparatus. The lock release actuator is configured to be coupled to the frame to simultaneously unlock both the vertical and horizontal rotation locks. The limb support includes a stowable leg support configured to provide support to the leg of a patient during obstetric delivery.

19 Claims, 22 Drawing Sheets

U.S. PATENT DOCUMENTS

| | | | |
|---|---|---|---|
| 2,872,259 | A | 2/1959 | Thorpe |
| 3,041,120 | A | 6/1962 | Burzlaff et al. |
| 3,041,121 | A | 6/1962 | Comper |
| 3,041,122 | A | 6/1962 | Weidkgenannt et al. |
| 3,100,129 | A | 8/1963 | Adolphson |
| 3,167,789 | A | 2/1965 | Wicks |
| 3,220,022 | A | 11/1965 | Nelson |
| 3,226,105 | A | 12/1965 | Weickgenannt et al. |
| 3,227,440 | A | 1/1966 | Scott |
| 3,231,905 | A | 2/1966 | Brochu |
| 3,281,141 | A | 10/1966 | Smiley et al. |
| 3,318,596 | A | 5/1967 | Herzog |
| 3,334,951 | A | 8/1967 | Douglass, Jr. et al. |
| 3,411,766 | A | 11/1968 | Lanigan |
| 3,486,747 | A | 12/1969 | Cardoso |
| 3,492,679 | A | 2/1970 | Drew |
| 3,587,592 | A | 6/1971 | Price et al. |
| 3,599,963 | A | 8/1971 | Grover |
| 3,686,696 | A | 8/1972 | Lanigan |
| 3,813,091 | A | 5/1974 | Metzger |
| 3,817,512 | A | 6/1974 | Torrey |
| 3,845,945 | A | 11/1974 | Lawley et al. |
| 3,851,870 | A | 12/1974 | Cook |
| 3,868,103 | A | 2/1975 | Pageot et al. |
| 3,997,926 | A | 12/1976 | England |
| 4,025,972 | A | 5/1977 | Adams et al. |
| 4,034,972 | A | 7/1977 | Peterson |
| 4,057,240 | A | 11/1977 | Damico et al. |
| 4,097,939 | A | 7/1978 | Peck et al. |
| 4,139,917 | A | 2/1979 | Fenwick |
| 4,148,472 | A | 4/1979 | Rais et al. |
| 4,225,126 | A | 9/1980 | Lee |
| 4,225,127 | A | 9/1980 | Strutton |
| 4,227,269 | A | 10/1980 | Johnston |
| 4,233,649 | A | 11/1980 | Scheer et al. |
| 4,247,091 | A | 1/1981 | Glowacki et al. |
| 4,323,060 | A | 4/1982 | Pecheux |
| 4,333,638 | A | 6/1982 | Gillotti |
| 4,336,965 | A | 6/1982 | Lipp |
| 4,356,578 | A | 11/1982 | Clark |
| 4,395,071 | A | 7/1983 | Laird |
| 4,411,035 | A | 10/1983 | Fenwick |
| 4,426,071 | A | 1/1984 | Klevstad |
| 4,457,502 | A | 7/1984 | Beach |
| 4,472,845 | A | 9/1984 | Chivetta et al. |
| 4,552,348 | A | 11/1985 | Forssmann et al. |
| 4,564,164 | A | 1/1986 | Allen et al. |
| 4,577,730 | A | 3/1986 | Porter |
| 4,615,058 | A | 10/1986 | Feldt |
| 4,632,349 | A | 12/1986 | Anstey |
| 4,639,954 | A | 2/1987 | Speed |
| 4,646,211 | A | 2/1987 | Gallant et al. |
| 4,682,376 | A | 7/1987 | Feldt |
| 4,688,780 | A | 8/1987 | Hanz |
| 4,698,837 | A | 10/1987 | Van Steenburg |
| 4,724,555 | A | 2/1988 | Poehner et al. |
| 4,751,754 | A | 6/1988 | Bailey et al. |
| 4,805,249 | A | 2/1989 | Usman et al. |
| 4,807,618 | A | 2/1989 | Auchinleck et al. |
| 4,821,350 | A | 4/1989 | Feldt |
| 4,860,394 | A | 8/1989 | Benessis et al. |
| 4,882,566 | A | 11/1989 | Koerber, Sr. et al. |
| 4,882,797 | A | 11/1989 | Failor et al. |
| 4,886,258 | A | 12/1989 | Scott |
| 4,894,876 | A | 1/1990 | Fenwick |
| 4,898,491 | A | 2/1990 | Steenburg |
| 4,940,218 | A | 7/1990 | Akcelrod |
| 4,968,013 | A | 11/1990 | Kuck |
| 4,993,762 | A | 2/1991 | Rogers et al. |
| 5,039,167 | A | 8/1991 | Sweet |
| 5,060,327 | A | 10/1991 | Celestina et al. |
| 5,103,384 | A | 4/1992 | Drohan |
| 5,104,363 | A | 4/1992 | Shi |
| 5,109,554 | A | 5/1992 | Borders et al. |
| 5,116,008 | A | 5/1992 | Allen |
| 5,129,116 | A | 7/1992 | Borders et al. |
| 5,129,117 | A | 7/1992 | Celestina et al. |
| 5,134,737 | A | 8/1992 | Wyman |
| 5,134,739 | A | 8/1992 | Gaffe et al. |
| 5,148,562 | A | 9/1992 | Borders |
| 5,157,800 | A | 10/1992 | Borders |
| 5,161,274 | A | 11/1992 | Hayes et al. |
| 5,197,156 | A | 3/1993 | Stryker et al. |
| 5,201,087 | A | 4/1993 | Wickham |
| 5,205,004 | A | 4/1993 | Hayes et al. |
| D336,577 | S | 6/1993 | Celestina et al. |
| D336,578 | S | 6/1993 | Celestina |
| 5,214,812 | A | 6/1993 | Bartow |
| 5,226,187 | A | 7/1993 | Borders et al. |
| 5,329,657 | A | 7/1994 | Bartley et al. |
| 5,331,698 | A | 7/1994 | Newkirk et al. |
| 5,362,302 | A | 11/1994 | Jensen |
| 5,375,276 | A | 12/1994 | Nelson et al. |
| 5,377,373 | A | 1/1995 | Shirari |
| 5,398,357 | A | 3/1995 | Foster |
| 5,423,097 | A | 6/1995 | Brule et al. |
| 5,454,126 | A | 10/1995 | Foster et al. |
| 5,460,346 | A | 10/1995 | Hirsch |
| 5,472,412 | A | 12/1995 | Knoth |
| 5,862,549 | A | 1/1999 | Morton et al. |
| 5,878,748 | A | 3/1999 | Garth et al. |
| 5,913,774 | A | 6/1999 | Feddema |
| 5,926,878 | A | 7/1999 | Morton et al. |
| 5,933,888 | A | 8/1999 | Foster et al. |
| 5,941,175 | A | 8/1999 | Bannister |
| 5,961,085 | A | 10/1999 | Navarro et al. |
| 6,058,534 | A | 5/2000 | Navarro et al. |
| 6,112,345 | A | 9/2000 | Foster et al. |
| 6,141,806 | A | 11/2000 | Bobey et al. |
| 6,174,068 | B1 | 1/2001 | Ambach et al. |
| 6,202,230 | B1 | 3/2001 | Borders |
| 6,226,821 | B1 | 5/2001 | Heimbrock et al. |
| 6,230,345 | B1 | 5/2001 | Borrero et al. |
| 6,282,738 | B1 | 9/2001 | Heimbrock et al. |
| 6,289,537 | B1 | 9/2001 | Hopper et al. |
| 6,408,464 | B1 | 6/2002 | Weismiller et al. |
| 6,409,131 | B1 | 6/2002 | Bentley et al. |
| 6,412,126 | B2 | 7/2002 | Heimbrock et al. |
| 6,470,520 | B1 | 10/2002 | Weismiller et al. |
| 6,546,577 | B1 | 4/2003 | Chinn |
| 6,618,882 | B2 | 9/2003 | Heimbrock et al. |
| 6,654,974 | B2 | 12/2003 | Ruehl et al. |
| 6,854,145 | B2 | 2/2005 | Ruehl et al. |
| 6,857,153 | B2 | 2/2005 | Ruehl et al. |
| 2003/0088917 | A1* | 5/2003 | Ruehl et al. .................... 5/600 |
| 2003/0140724 | A1* | 7/2003 | Lee et al. .................. 74/501.6 |
| 2004/0226094 | A1 | 11/2004 | Heimbrock et al. |
| 2006/0081084 | A1* | 4/2006 | Nishino et al. ............. 74/473.1 |
| 2006/0117485 | A1 | 6/2006 | Brophy et al. |

FOREIGN PATENT DOCUMENTS

| | | |
|---|---|---|
| DE | 2324486 | 12/1973 |
| DE | 29 11 743 | 10/1979 |
| DE | 35 00 313 | 7/1985 |
| DE | 297 02 889 | 5/1997 |
| DE | 196 04 549 | 8/1997 |
| DE | 298 00 015 | 5/1998 |
| EP | 0 150 254 | 4/1984 |
| EP | 0 376 066 | 12/1989 |
| EP | 0 604 240 | 6/1994 |
| EP | 0 681 799 | 5/1995 |
| EP | 0 839 508 | 5/1998 |
| EP | 0 845 254 | 6/1998 |

| | | |
|---|---|---|
| FR | 636085 | 3/1928 |
| FR | 1456058 | 10/1966 |
| FR | 1.518.724 | 12/1966 |
| FR | 1566571 | 5/1969 |
| FR | 2.061.319 | 5/1971 |
| FR | 2666013 | 2/1992 |
| GB | 497662 | 12/1938 |
| GB | 1389344 | 4/1975 |
| GB | 2041737 | 9/1980 |
| GB | 2225228 | 5/1990 |
| JP | 55-50357 | 12/1980 |
| JP | 56-109663 | 8/1981 |
| JP | 58-81032 | 5/1983 |
| JP | 60-145138 | 5/1985 |
| JP | 60-195018 | 10/1985 |
| JP | 61-119257 | 6/1986 |
| JP | 61-168351 | 7/1986 |
| JP | 2-147120 | 6/1990 |
| JP | 2-297366 | 7/1990 |
| JP | 2-297367 | 7/1990 |
| JP | 2-297368 | 7/1990 |
| JP | 3-4808 | 1/1991 |
| JP | 3-4809 | 1/1991 |
| JP | 5-31145 | 2/1993 |
| JP | 6-12755 | 1/1994 |
| JP | 60-85749 | 3/1994 |
| JP | 61-22577 | 5/1994 |
| JP | 61-44019 | 5/1994 |
| JP | 61-50626 | 5/1994 |
| JP | 7-112012 | 5/1995 |
| SU | 381350 | 3/1970 |
| WO | WO 92/18082 | 10/1992 |
| WO | WO 92/18083 | 10/1992 |
| WO | WO 93/09750 | 5/1993 |
| WO | WO 99/23991 | 5/1999 |
| WO | WO 00/07537 | 2/2000 |
| WO | 0193796 | 12/2001 |

OTHER PUBLICATIONS

Stryker Adel, "2100EC Chiildbearing Bed, Ultimate convenience and comfort", Jan. 1994, 6 pgs.
Stryker Adel, "500XL Childbearing Bed", May 1995, 2 pgs.
Stryker Adel, "2100 Childbearing Bed, Service Manual", 1998, pp. 1-28.
Stryker Adel, "500XL Childbearing Bed, Service Manual", 1986, pp. 1-16.
European Search Report dated Dec. 19, 2008, Application No./Patent No. 06255908.3-1257/1787619, seven pages.

* cited by examiner

BIRTHING BED FOOT SUPPORT RELEASE HANDLE

CROSS REFERENCE TO RELATED APPLICATIONS

This application claims the benefit of a U.S. Provisional Patent Application, Ser. No. 60/737,820, filed on Nov. 17, 2005, and entitled "Birthing Bed Foot Section" and a U.S. Provisional Patent Application, Ser. No. 60/803,841, filed on Jun. 2, 2006, and entitled "Ob/Gyn Bed," each of the foregoing provisional applications being hereby incorporated by reference herein.

BACKGROUND OF THE INVENTION

The present disclosure relates to accessories that attach to birthing beds to support the body of a patient during obstetric labor and delivery. More particularly, the present disclosure relates to patient support accessories that attach to birthing beds or birthing bed accessory frames and that are configured to engage and support limbs of the body of a patient during labor and delivery.

During obstetric delivery in which a patient is in a reclining position, it is desirable for the legs of a patient to be positioned by a caregiver so as not to be supported by an underlying table surface. In many situations is important to have a limb-support apparatus permitting flexure of the knee joints of a patient by a sufficient amount to place the patient in a desired position for delivery of a child.

SUMMARY OF THE INVENTION

The present disclosure comprises one or more of the features recited in the appended claims and/or the following features which, alone or in any combination, may comprise patentable subject matter:

A limb support is configured to be secured to a patient-support apparatus having two generally parallel longitudinal members spaced apart such as a birthing bed for obstetric delivery. The limb support, embodied as a foot support, comprises a foot-receiving portion which is configured to be adjustable to support the foot of a patient thereon, especially, for example, a patient in labor for obstetric delivery. The foot support may be shaped to engage a foot of a patient.

The foot support may further comprise a frame configured to pivot about both a vertical axis and a horizontal axis in relation to the patient support apparatus. A pair of locks configured to block pivoting movement of the frame about an associated axis are coupled to the frame. The frame includes a U-shaped bracket having a pair of walls positioned in a parallel spaced-apart relation to one another. Each wall is formed to include a blind slot having a termination and arranged to open away from the horizontal axis of rotation.

A lock release actuator is coupled to the frame to receive an actuation force from a caregiver to simultaneously unlock both the vertical rotation-blocking lock and the horizontal rotation-blocking lock to allow the caregiver to move the foot support to a desired position. In some embodiments, the lock release actuator may be embodied as a grip. The grip is coupled to a crossmember positioned such that portions of the crossmember are received by both slots for slidable movement therein. The crossmember is coupled to the locks via a pair of cables, each cable being coupled to an associated rotation-blocking lock.

The grip is generally J-shaped and arranged to receive a hand of a caregiver for application of the actuation force. The grip is configured to transmit the actuation force to the locks regardless of where the actuation force is applied along the length of the grip.

When an actuation force is applied to the grip along a generally longitudinal axis of the foot support frame, the crossmember will move toward the opening of both slots in a generally symmetric motion. However, the arrangement of the slot terminations allows the crossmember to form a pivot axis about the termination if an oblique actuation force is applied to the grip. Thus, while one end of the crossmember pivots about the slot termination, the other end is free to move toward the slot opening allowing the crossmember to sufficiently displace the cables so that the associated locks are released.

The limb support may further comprise a leg support mounted on the foot support and moveable from a stowed position below the foot support to one of a number of use positions. The leg support may be pivotably coupled to the foot support through a pivot-coupler that is coupled to the foot support. The leg support comprises an arm, a ball-lock assembly coupled to the arm, and a cushion assembly coupled to the ball-lock assembly to receive and support a portion of a leg of an obstetric patient. The cushion may be configured to conform to the contours of the body of the patient. In some embodiments, the leg support may have an upwardly facing surface which is convex in shape.

The pivot-coupler has a body and a spring-loaded release handle. The pivot-coupler also has an internal pivot shaft about which the arm pivots.

The arm comprises a pivot collar and an offset shaft. The pivot collar is formed to include two slots which receive a lock-rod coupled to the spring-loaded release handle to maintain the arm in a position in either a stowed position or a use position. The arm, and therefore the leg support, are able to pivot about an axis to move the leg support from the stowed position to the use position to receive the leg of the patient.

The ball-lock mechanism includes a housing, a release handle, a ball mount, and a spring bias assembly. The ball-lock mechanism is moveable between an unlocked position wherein the ball mount is free to pivot relative to the housing and a locked position wherein the ball mount is inhibited from moving relative to the housing. The ball mount comprises a spherical portion and a shaft configured to engage with a mount coupled to the cushion assembly. The release handle is used to engage the ball-lock mechanism.

The release handle includes a bent shaft and a grip. The release handle is rotated by the caregiver to move the ball-lock mechanism between the locked and unlocked positions. A cam supports a flange of the spring bias assembly. The flange supports a plurality of spring washers that in turn support a cradle that receives the spherical portion of the ball mount. The cam is four sided with two opposing sides having a thickness smaller than the other two opposing sides. Thus, rotation of the cam ninety degrees in a prescribed direction changes the displacement of the flange and therefore the deflection of the spring washers.

When the force exerted by spring washers on the cradle, and therefore the ball mount, is minimal, the ball mount is pivotable in a plurality of directions about the center of the spherical portion. When the cam is rotated in an opposite direction, the cradle is urged against the spherical portion which urges the spherical portion against an annular surface of the housing to cause the ball mount to be restrained from moving.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompany figures in which.

DETAILED DESCRIPTION OF THE DRAWINGS

Figure 1:
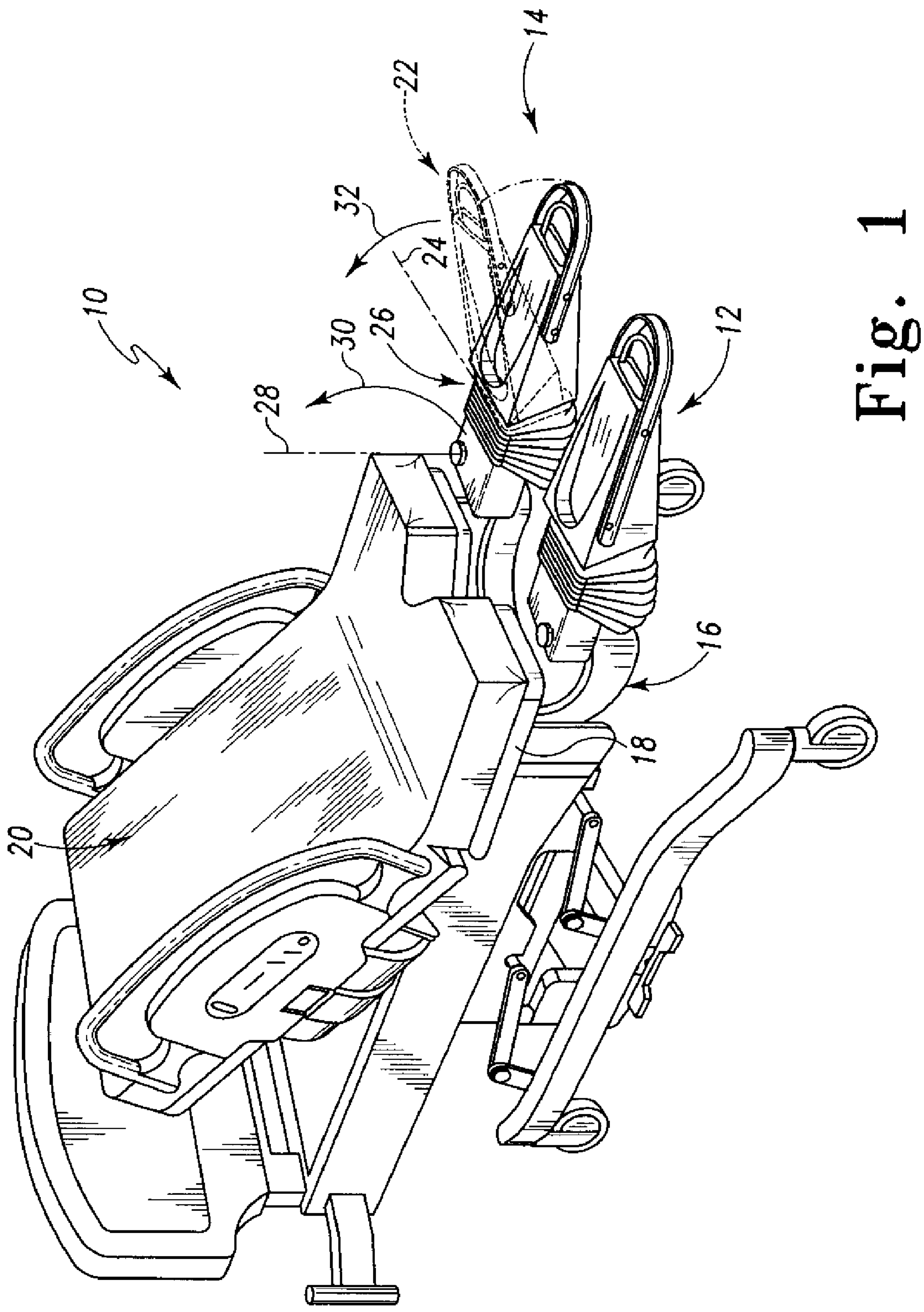
FIG. 1 is a perspective view from a foot end corner of a patient-support apparatus of the present disclosure showing a pair of limb supports coupled to an articulable yoke and a left limb support being shown in an articulated position in phantom.
Figure 2:
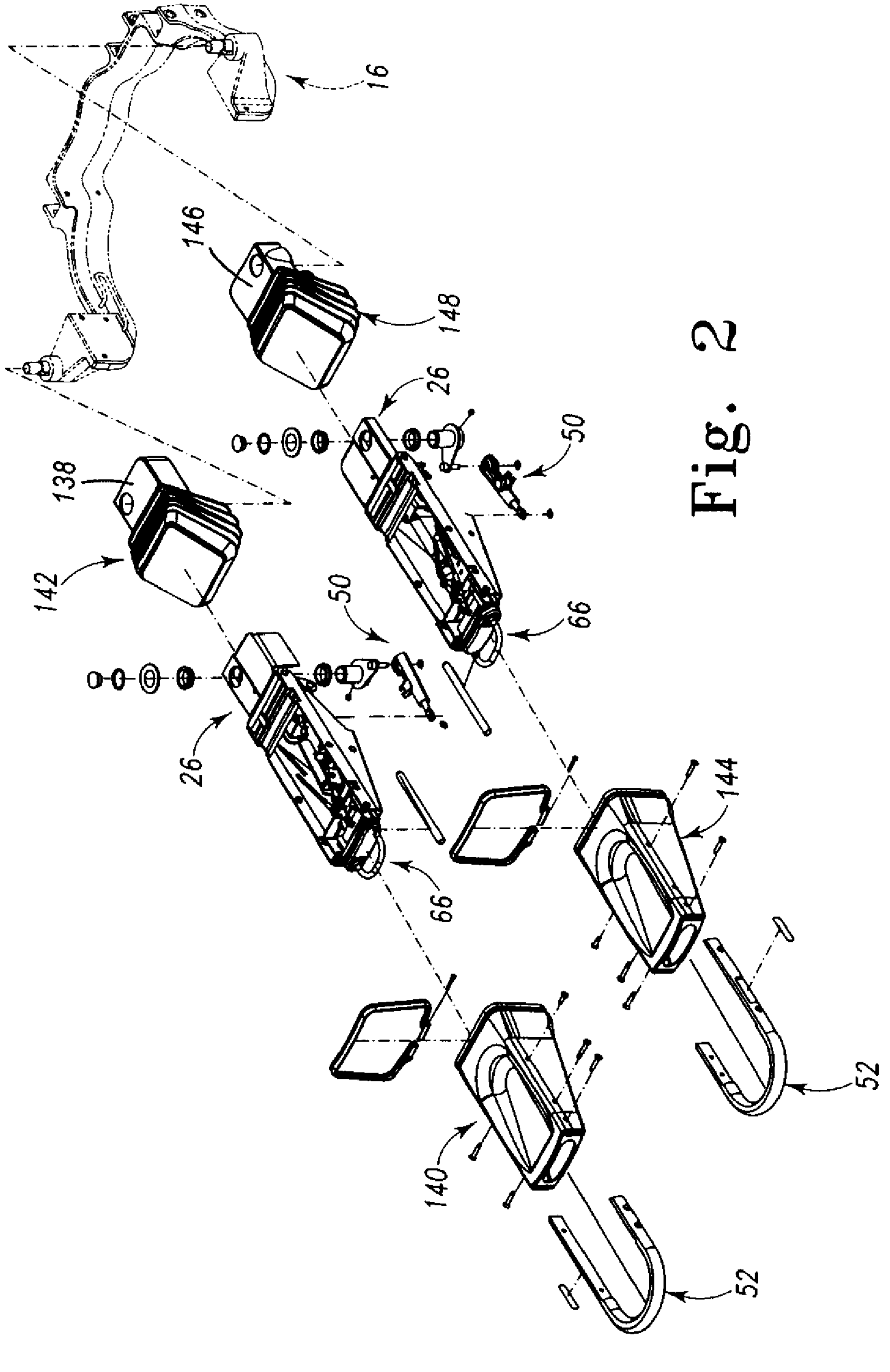
FIG. 2 is an exploded perspective view of illustrative components included in a limb support lock release mechanism of the patient-support apparatus of FIG. 1.

A patient-support apparatus 10 for obstetric labor and delivery includes a pair of limb supports 12 and 14 embodied as foot supports 12 and 14. Foot supports 12 and 14 are of a similar construction with foot support 12 being a patient right hand version and foot support 14 being a patient left hand version. As depicted in FIG. 1, foot supports 12 and 14 are articulable relative to a yoke 16 of patient support apparatus 10 with foot support 14 being shown in an articulated position (in phantom). Articulation of the foot supports 12 and 14 permits a caregiver to adjust the position of the foot supports 12 and 14 to position the feet of a patient supported on a seat deck 18 and mattress 20 during the birthing process.

In the foregoing discussion, the structure of foot support 14 will be discussed and it should be understood that foot support 12 operates in a substantially similar manner with the only difference being that foot support 14 is a left hand version and a foot support 12 is a right hand version. As shown in FIG. 1, a main portion 22 of foot support 14 is pivotable about an axis 24 that is generally horizontal. Additionally, a mount portion 26 of foot support 14 is pivotable about a generally vertical axis 28 that thereby pivots the entire foot support 14 about axis 28.

Figure 3:
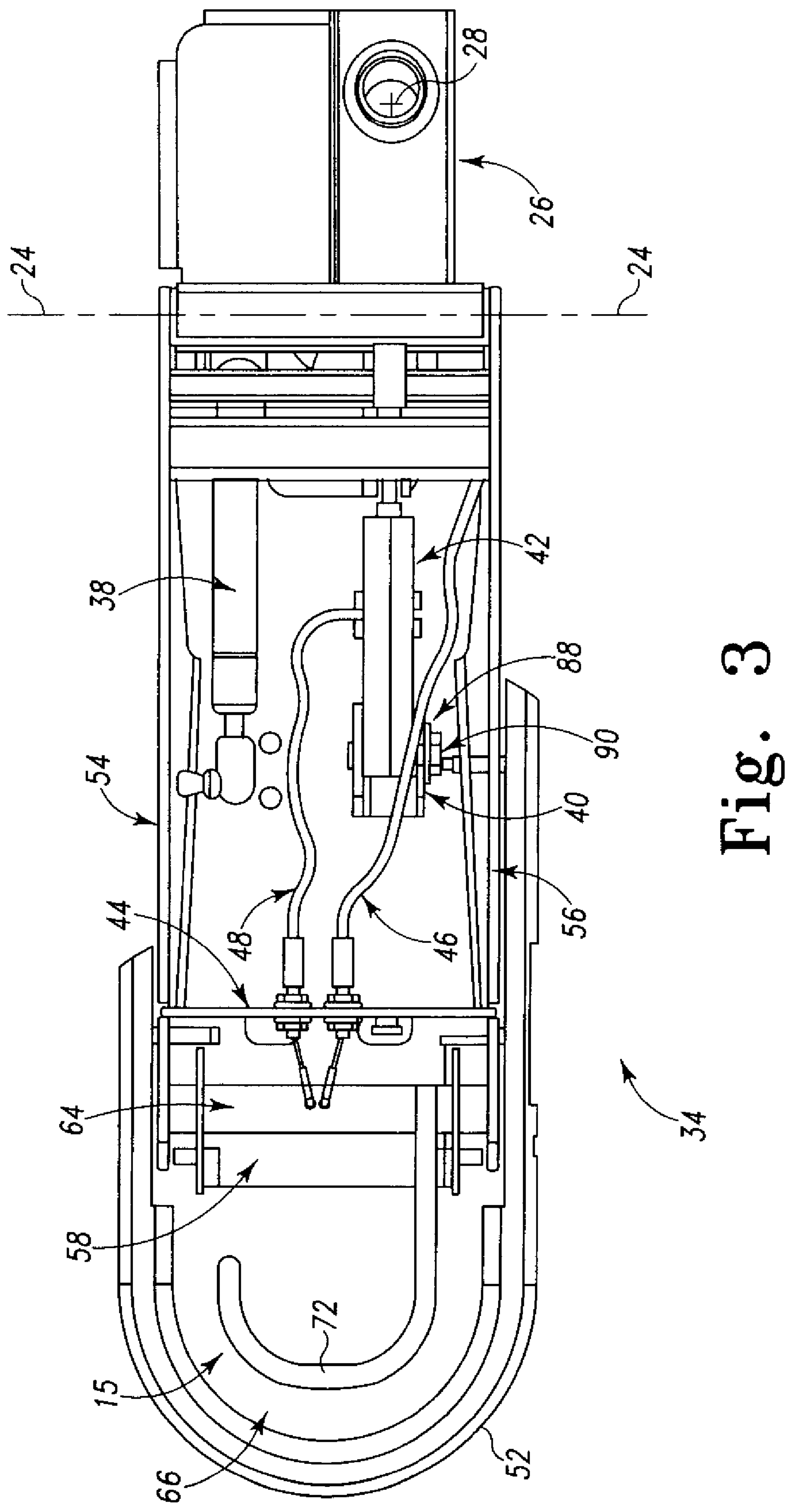
FIG. 3 is a plan view of a limb support embodied as a foot support (with a cover removed) showing (from left to right) an outer grip, a lock release grip, a frame, and horizontal and vertical pivot mounts.

Foot support 14 is shown with covers omitted to show the mechanical structure of the foot support 14, as suggested in FIG. 3. Foot support 14 is pivotable about axis 28 in a plurality of directions as depicted by arrow 30 as shown, for example, in FIG. 1. Referring once again to FIG. 3, main portion 22 is pivotably coupled to the mount portion 26 and pivotable about axis 24 as depicted by arrow 32. The main portion 22 comprises a lock release 15 coupled to a frame 34, mount 36 coupled to frame 34 and configured to engage a gas spring 38 which acts as a counterbalance to resists rotation of main portion 22 about axis 24 so as to assist a caregiver in adjusting the position of main portion 22 about axis 24 when the load of a patient's foot is supported on foot support 14. Main portion 22 further comprises a bracket 40 coupled to frame 34 and positioned to support a locking mechanism 42 which is biased to a locked position to resists rotation of main portion 22 relative to mount portion 26 of foot support 14.

Figure 5:
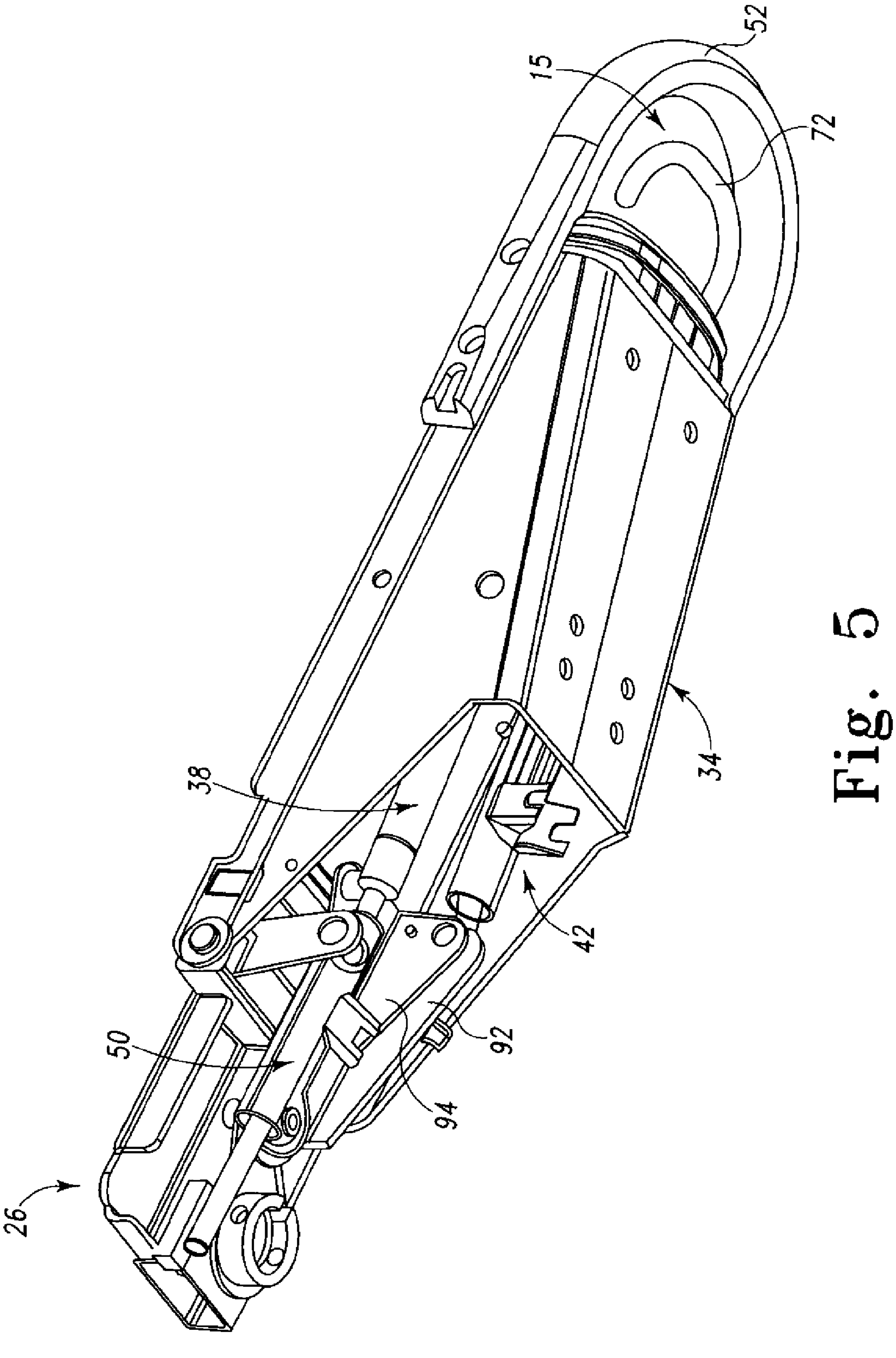
FIG. 5 is a perspective view of the underside of the foot support of FIG. 3.
Figure 6:
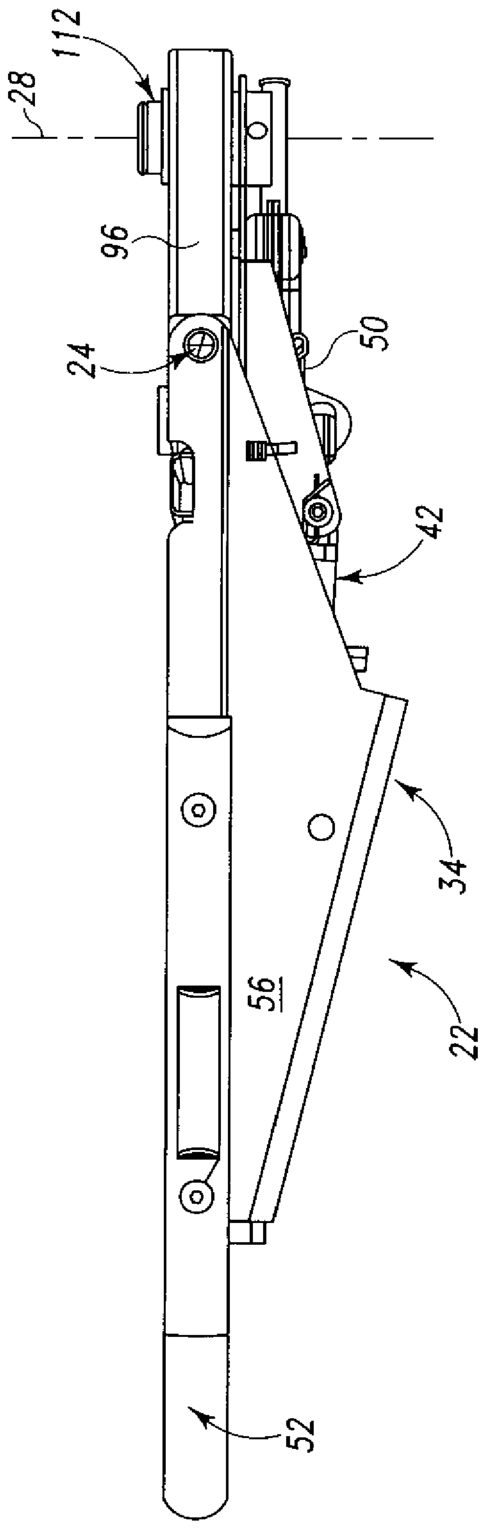
FIG. 6 is a side elevation view of the foot support of FIG. 3.

The main portion 22 further comprises a flange 44 coupled to opposing sidewalls 54 and 56 of frame 34 as shown in FIG. 3. Flange 44 supports two release cable assemblies 46 and 48. Release cable 46 is coupled to locking mechanism 42 at one end of release cable 46 and is actuable to release locking mechanism 42 to permit main portion 22 to move about axis 24 relative to mount portion 26. Release cable 48 is coupled to a locking mechanism 50 (best seen in FIG. 5) and is actuable to release locking mechanism 50 to permit mount portion 26 to pivot about axis 28 and the direction of arrow 30.

Figure 7:
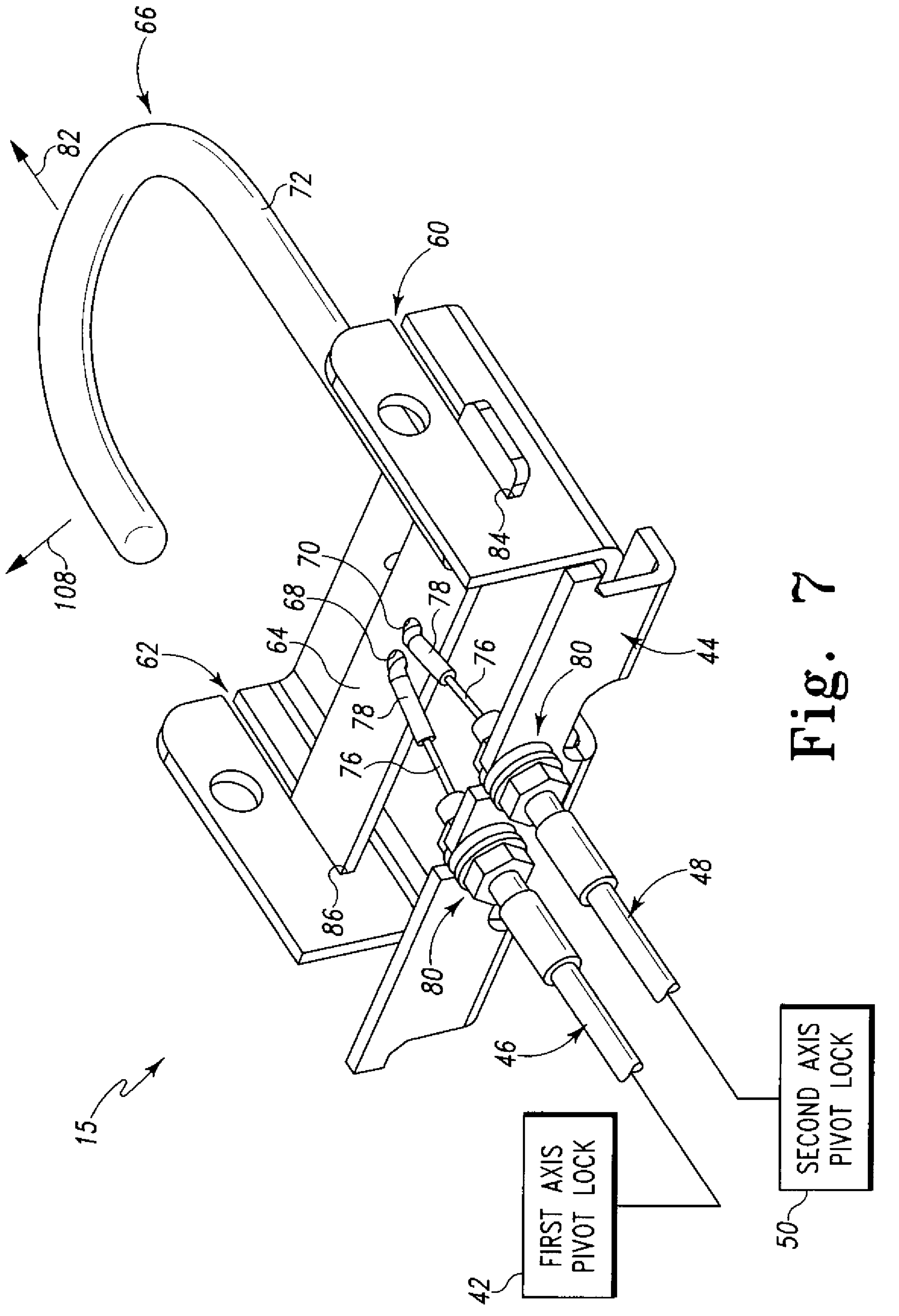
FIG. 7 is a perspective view of the lock release mechanism of FIG. 4 showing the grip coupled to a crossmember positioned in a pair of guide slots formed in a guide bracket and a pair of release cables coupled to the crossmember on first ends.

The main portion 22 further comprises an outer grip 52 that is U-shaped and is coupled to the outer surfaces of walls 54 and 56 of frame 34 as shown in FIG. 3. The outer grip 52 is accessible by a user to guide foot support 14 when foot support 14 is repositioned about axes 24 and 28. The main portion 22 still further comprises a guide bracket 58 coupled to frame 34. The guide bracket 58 has two slots 60 and 62 that receive a crossmember 64 of a release handle 66 such that the crossmember is free to move relative to guide bracket 58 within the slots 60 and 62 as shown in FIG. 7. The crossmember 64 has two apertures 68 and 70 that are configured to receive a portion of release cables 48 and 46 respectively. The release handle 66 comprises a grip portion 72 that is accessible by a user to grip and thereby actuate release cables 46 and 48 simultaneously to allow adjustment of foot support 14 about axes 24 and/or 28.

Figure 4:
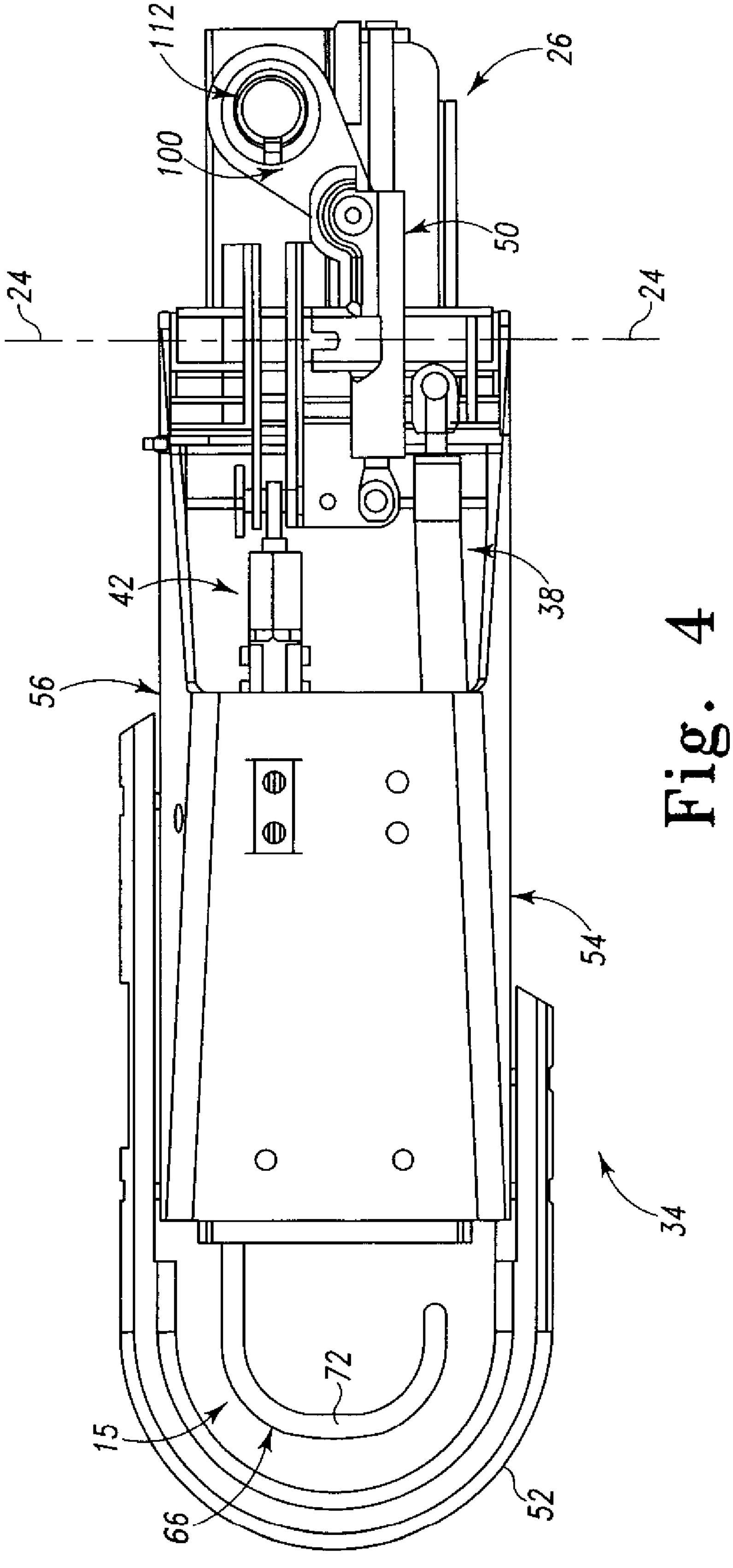
FIG. 4 is a bottom view of the foot support of FIG. 3 showing the foot support with portions removed.

Release cables 46 and 48 are of similar construction and each include an outer sheath 74 and an inner cable 76 which moves relative to outer sheath 74, as shown best in FIGS. 4 and 7. Each of the release cables 46 and 48 further includes an engagement end 78 received in apertures 70 and 68 respectively. The release cable assemblies 46 and 48 are each supported on flange 44 by a fastener assembly 80 that maintains the outer sheath 74 of each cable 46 and 48 fixed relative to the frame 34. Thus, when grip portion 72 is actuated relative to frame 34 such as in the direction of arrow 82, the inner cables 76 of each release cable 46 and 48 move relative to frame 34 which results in the release of locking mechanisms 42 and 50 thereby permitting adjustment of the position of foot support 14 relative to the yoke 22.

The locking mechanisms 42 and 50 are biased such that the inner cables 76 are pulled toward the locking mechanisms 42 and 50 thereby urging the crossmember 64 in a direction opposite of arrow 82, as shown in FIG. 7. The slots 60 and 62 are blind slots with terminations 84 and 86 respectively. The bias of locking mechanisms 42 and 50 transmitted through inner cables 76 of release cables 46 and 48 urge the crossmember 64 to engage terminations 84 and 86. Movement of the crossmember 64 relative to a guide bracket 58 overcomes the bias of locking mechanisms 42 and 50 thereby releasing locking mechanisms 42 and 50. In the illustrative embodiment of FIG. 7, the crossmember 64 is free to move in a plurality of directions in a plane of movement defined by slots 60 and 62 of guide bracket 58.

Because crossmember 64 is free to move in a plurality of directions, a user need not activate release handle 66 in the direction of arrow 82 in order to release locking mechanisms 42 and 50. For example, if a user grips grip portion 72 to move release handle 66 in the direction of the arrow 108, the motion is transferred to crossmember 64 such that crossmember 64 maintains contact with termination 86 of slot 62 and crossmember 64 moves within the slot 60 such that crossmember 64 pivots relative to termination 86.

In addition, crossmember 64 is free to move in the plane of movement defined by slots 60 and 62 in a direction perpendicular to the longitudinal length of slots 60 and 62. Thus, inner cables 76 move relative to outer sheaths 74 of release cable 46 and 48 thereby releasing locking mechanisms 42 and 50. Therefore, a user may grip release handle 66 at any point along the length of grip release handle 66 to to apply an actuation force in any of a number of directions to simultaneously release locking mechanisms 42 and 50.

Once again referring again to FIG. 3, locking mechanism 42 is pinned to bracket 40 by a retaining pin 88 and hairpin fastener 90 that retains pin 88 on bracket 40. As suggested in FIG. 5, locking mechanism 42 is also pinned to two flanges 92 and 94 coupled to a frame portion 96 of main portion 330 retaining pin 88 and hairpin fastener 90 couple the locking mechanism 42 to the flanges 94 and 92. Locking mechanism 42 is pivotable relative to bracket 40 about pin 88 and relative to flanges 92 and 94. When in the locked position, the locking mechanism 42 maintains the distance between the pins 88 and prevents rotation of main portion 22 about axis 24. By changing the distance between pin 88 and bracket 40 and pin 88 in flanges 92 and 94, main portion 22 pivots about axis 24 to change the position of foot support 14.

Figure 9:
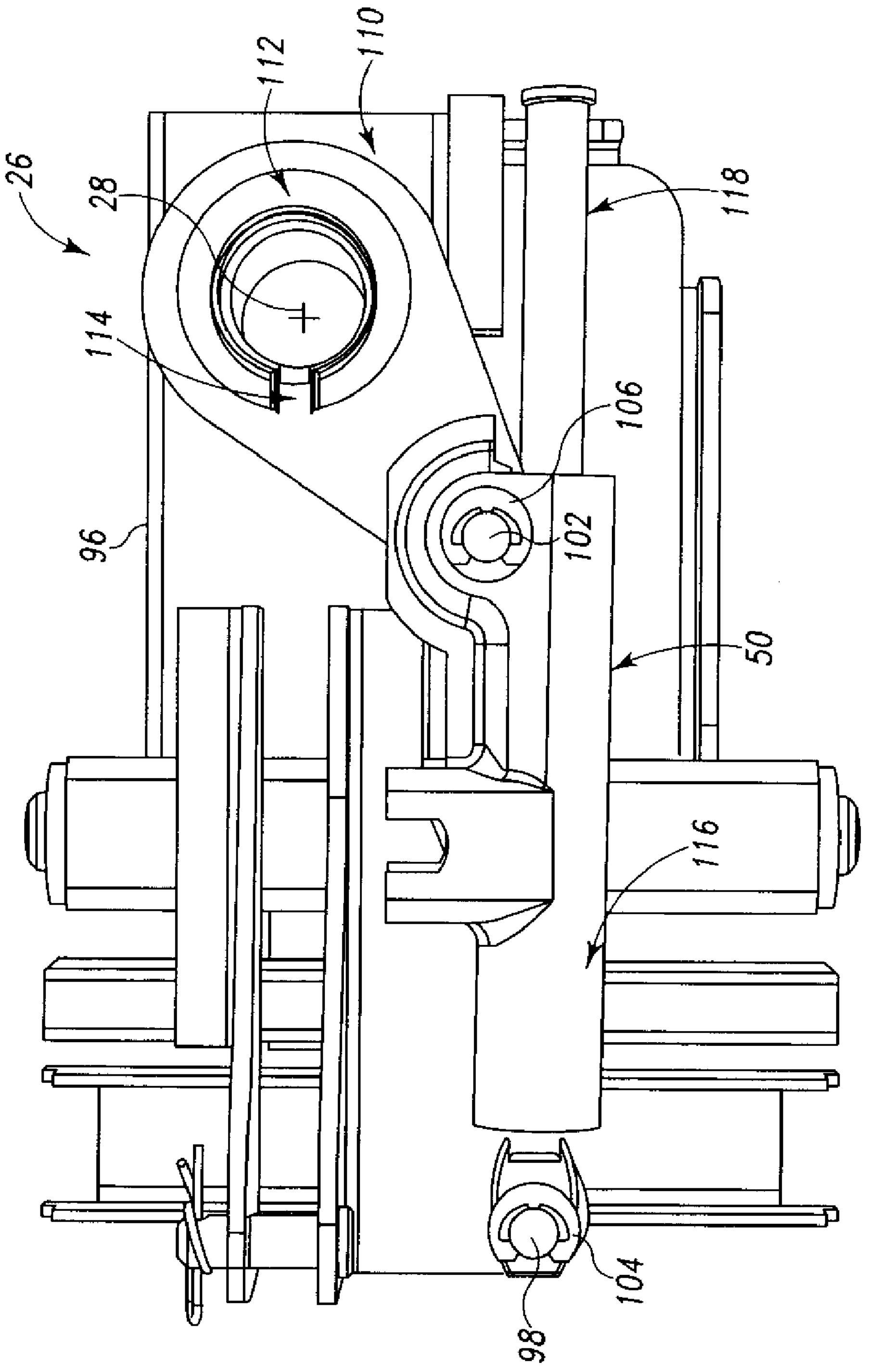
FIG. 9 is an enlarged plan view of the horizontal and vertical pivot mounts of FIG. 3.

Locking mechanism 50 is coupled to a frame 96 of mount portion 26 through a pin 98, as shown in FIG. 9. Locking mechanism 50 is also coupled to a cam plate 100 of a cam assembly 110 through a pin 102. Pins 98 and 102 are retained on locking mechanism 50 by a pair of e-rings 104 and 106 respectively. Cam assembly 110 further comprises a keyed collar 112 that is configured to engage a shaft to on yoke 22 of patient-support apparatus 10. The collar 112 comprises a keyed slot 114 that engages with a key (not shown) on the shaft (not shown) of the yoke 22. The shaft is fixed to the yoke 22 and keyed collar 112 is restrained from rotation about the shaft by the engagement of the keyed slot 114 with the key of the shaft.

Cam assembly 110 is pivotable relative to frame 96 of mount portion 26 about axis 28. The locking mechanism 50 prevents rotation of the cam assembly 110 relative to frame 96 when the locking mechanism is engaged. When the locking mechanism is released an outer housing 116 of locking mechanism 50 is free to move along a shaft 118 that thereby permits frame 96 of mount portion 26 to rotate relative to cam assembly 110 to a new orientation. The cam assembly 110 stays in the same or relative position as it relates to the yoke 22, but the mount portion 26 and thereby the remainder of the foot support 14 pivots relative to the yoke 22.

Figure 8:
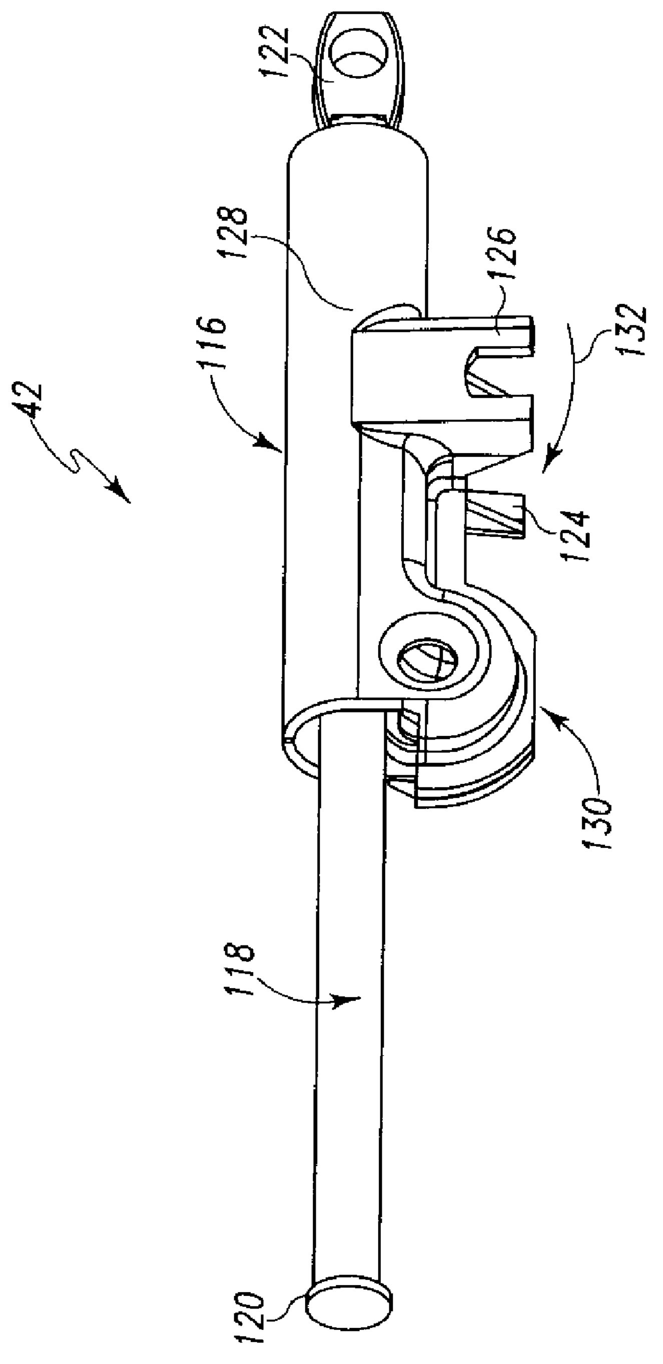
FIG. 8 is a perspective view of a locking mechanism showing a shaft coupled to a mount.

The locking mechanisms 42 and 50 operate in a similar fashion as will be discussed in reference to locking mechanism 42 shown in FIG. 8. The locking mechanism 42 is a wrap spring mechanism in which a wrap spring (not shown) engages the shaft 118 when the wrap spring is in a relaxed positioned. The inner diameter of the wrap spring is slightly smaller than the outer diameter of the shaft 118 such that when the wrap spring engages shaft 118 the spring is precluded from movement along the longitudinal length of the shaft 118 thereby securing the spring to the shaft to 118. Locking mechanism 42 further comprises an outer housing 116 that is engaged with the spring.

The housing 116 comprises a cylindrical main portion 128 and two flanges 124 and 126 with each flange coupled to opposing sides of the cylindrical main portion 128. The housing 116 also comprises a connecting flange 130 that is used to connect to the housing 116 to an external member (not shown). The flanges 124 and 126 are coupled to a terminal end of cable 46 to transmit the actuation force to the flanges. When the flanges 124 and 126 are brought together as depicted by arrow 132 in response to the actuation force transmitted by cable 46, the wrap spring, internal to the housing, is configured such that the inner diameter of the spring body is enlarged so that the spring is free to move along shaft 118. When the flanges 124 and 126 are released, the inner diameter of the spring contracts and the spring is secured to the shaft 118 and thus prevents the housing 116 from moving relative to the shaft 118.

The shaft 118 includes a flange 120 positioned at one end which prevents the spring and therefore the housing 116 from sliding off the end of the shaft 118. At the end of the shaft opposite to the flange 120 is an eyelet 122 coupled to the shaft 118 to connect the shaft 118 to another external member. In use, a release cable 48 is coupled to the locking mechanisms such that the inner cable 76 is connected to flange 124 and the outer sheath 74 is connected to flange 126 so that movement of the release handle 66 as discussed above causes the flanges 124 and 126 to contract in the direction of arrow 132 thereby releasing the locking mechanism 42. This permits the adjustment of the foot support 14 relative to yoke 22 to a plurality of positions about axis 24. The release of locking mechanism 50 occurs in a similar fashion and allows foot support 14 to be adjusted about axis 28.

Figure 10:
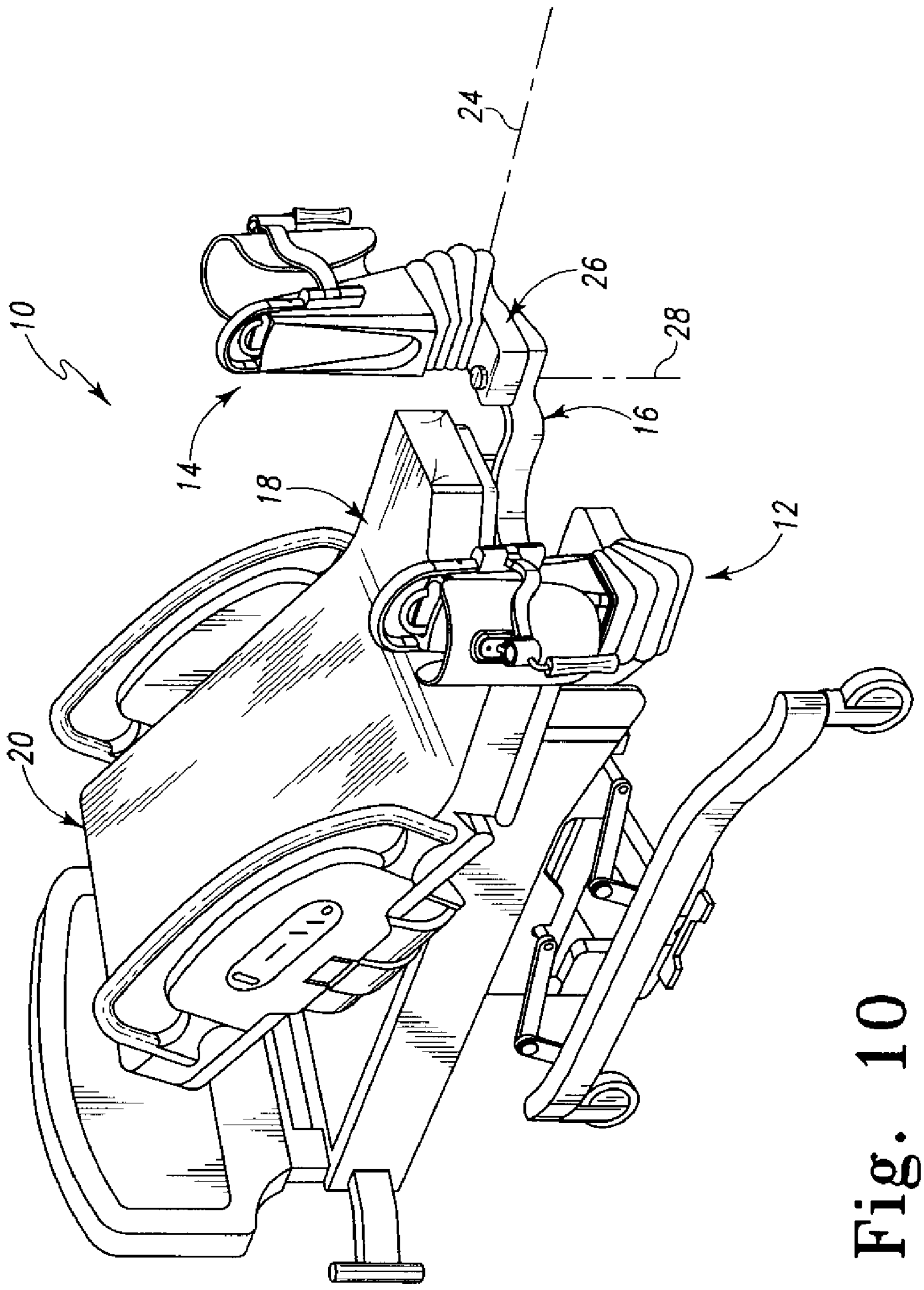
FIG. 10 is a perspective view similar to FIG. 1 showing the foot supports (and an accessory leg support mounted to each foot support) pivoted about both a vertical axis and a horizontal axis to move the foot supports to an upright out-of-the-way position.
Figure 11:
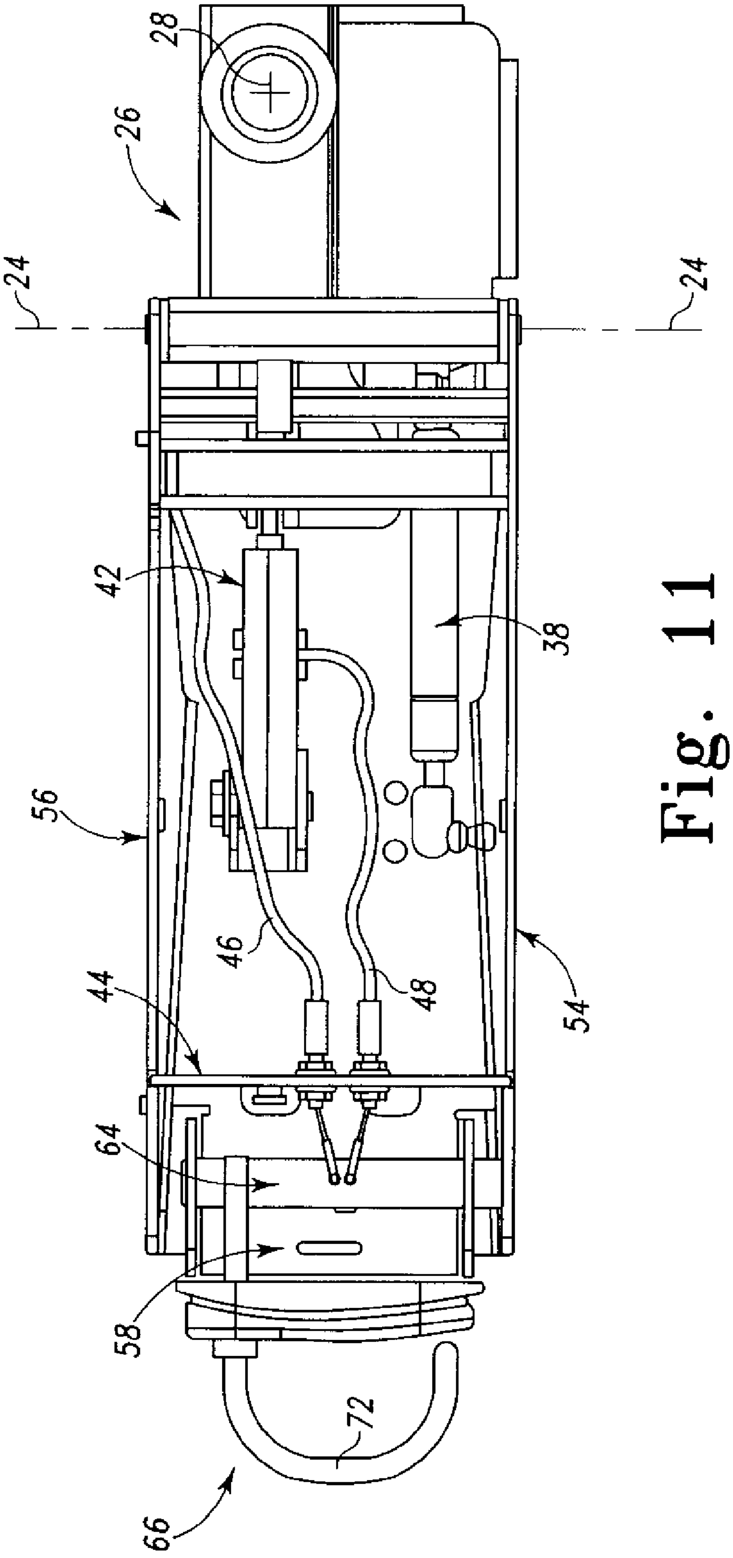
FIG. 11 is a plan view similar to FIG. 3 showing an outer grip removed.

For example, the foot supports 12 and 14 are each shown in a home position in FIG. 1 and shown articulated about both the generally vertical and generally horizontal axes to an upright out-of-the-way position as shown in FIG. 10. The foot supports 12 and 14 are adjustable to a plurality of positions about the generally horizontal and generally vertical axes so that the foot support 12 and 14 may be positioned to a plurality of positions and orientations as desired by the caregiver.

In the illustrative embodiment of FIG. 10, two leg supports 150 and 152 are coupled to foot supports 12 and 14 respectively. In addition, the foot support 12 comprises a foot receiving cover 140, a bellows cover 142 covering a horizontal pivoting mechanism, and a mount cover 138. The foot support 14 comprises a foot-receiving cover 144, a bellows 148, and a mount cover 146.

Figure 12:
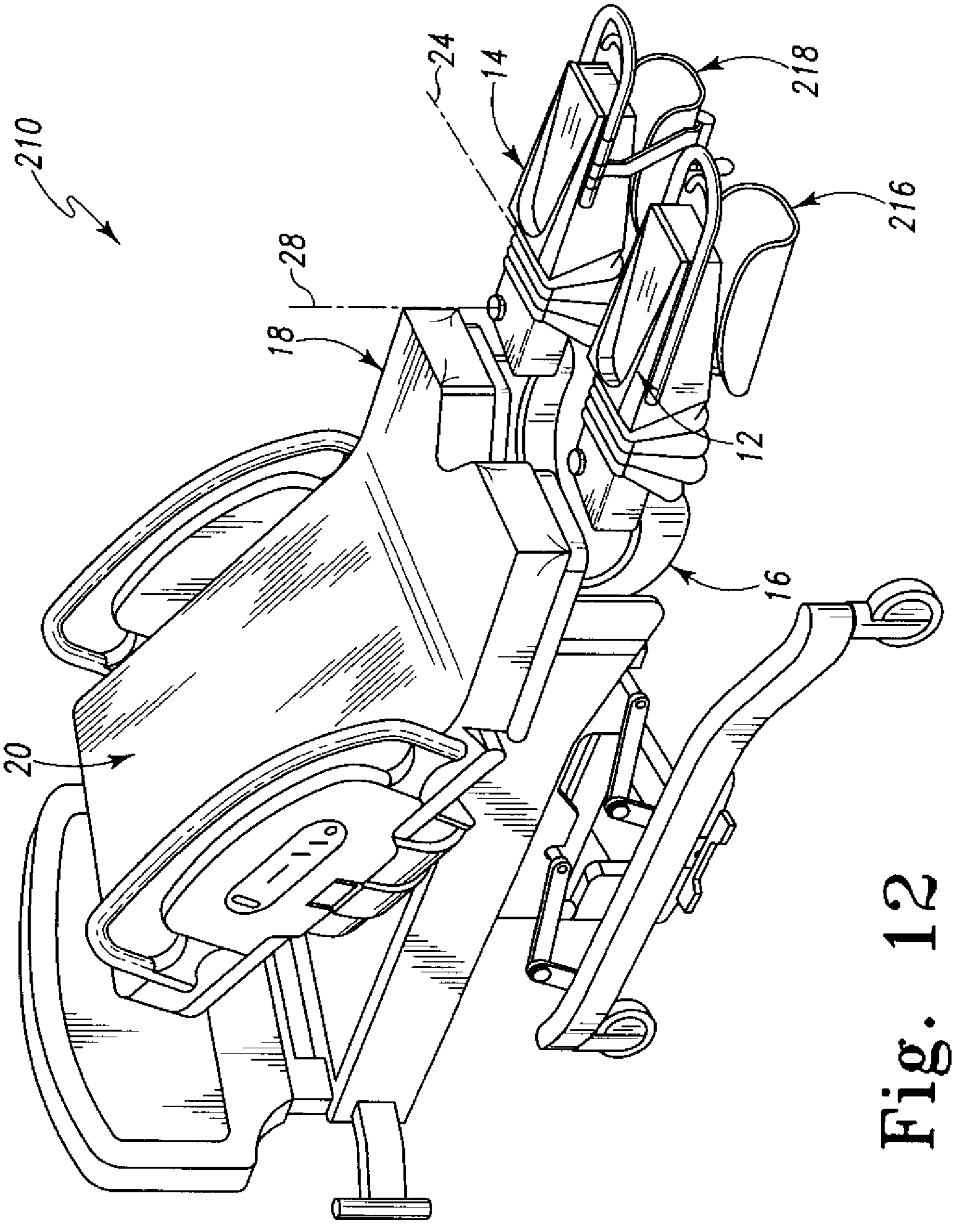
FIG. 12 is a perspective view of a patient-support apparatus in accordance with a second embodiment of the present disclosure showing a pair of foot supports further including a calf support mounted to and articulable relative to the foot support.

In a second illustrative embodiment of a patient-support apparatus 210 of FIG. 12, two limb supports 216 and 218 are coupled to foot supports 12 and 14, respectively. As suggested in FIGS. 12-14, the leg support 216 is moveable between a stowed position below foot support 16 as shown in FIG. 12 and any of a number of use positions as shown in FIG. 14. The leg support 216 and leg support 218 are similar in structure with the leg support 216 being configured as a right-hand version and the leg support 218 being configured as a left-hand version. The structure of leg support 216 will be discussed in detail below. It should be understood that the description of leg support 216 is applicable to the general structure of leg support 218 with the only difference being the handedness of the two leg supports 216 and 218.

Figure 13:
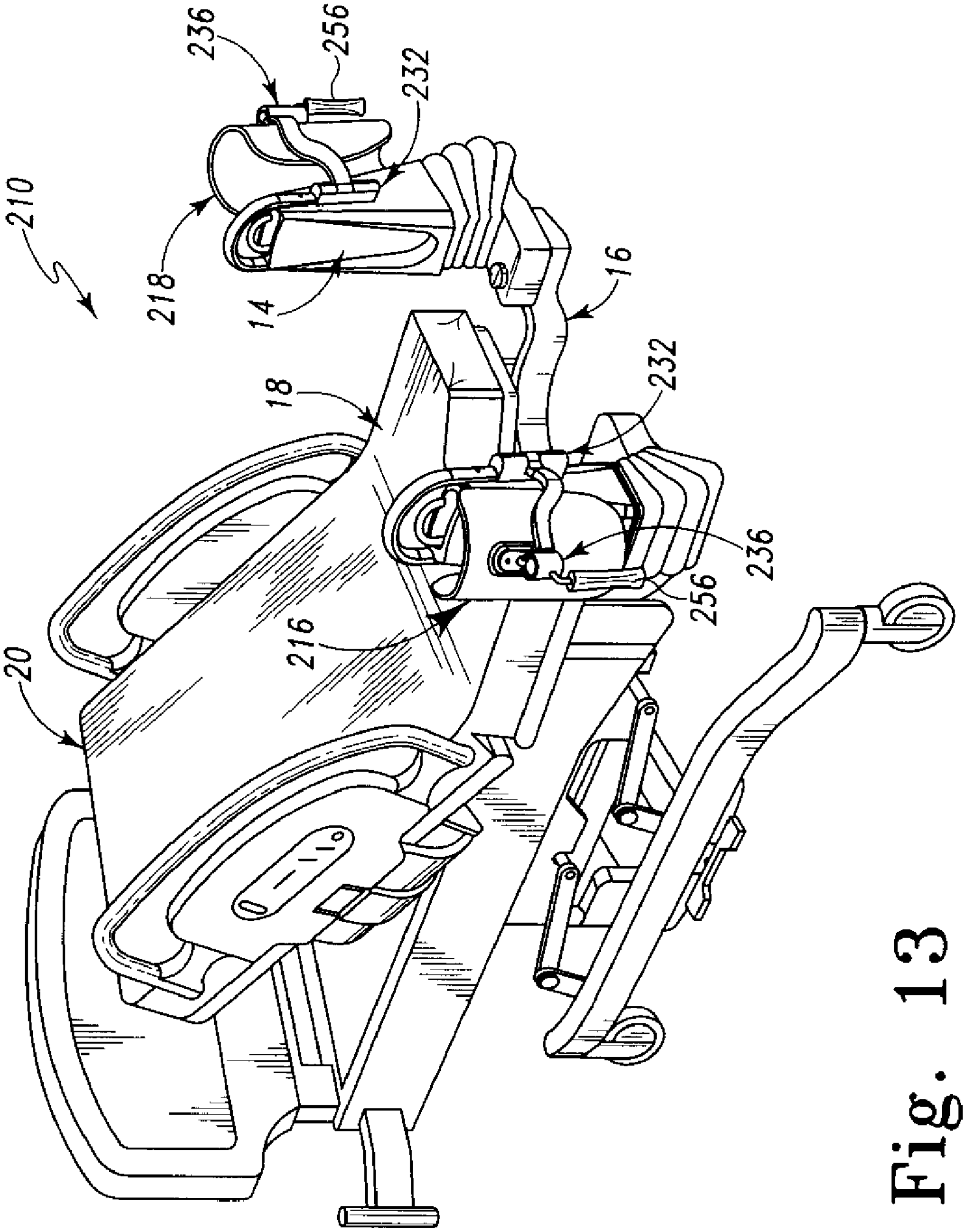
FIG. 13 is a perspective view of the patient-support apparatus of FIG. 12 with each of the foot supports articulated to an out-of-the-way position to permit a caregiver access to a seat support section area of the patient-support apparatus.
Figure 14:
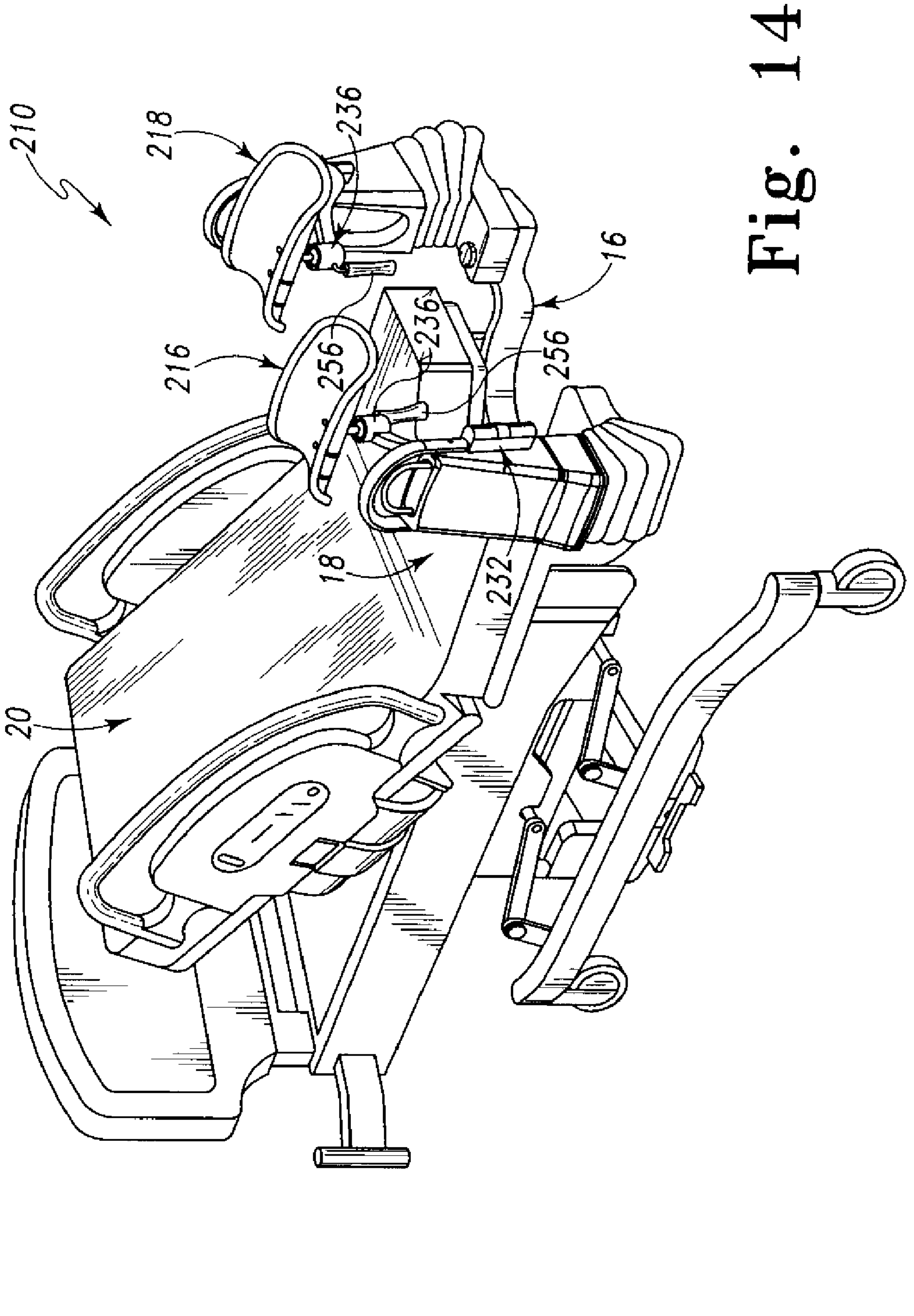
FIG. 14 is a perspective view of the patient-support apparatus of FIG. 12 with the foot supports and calf support articulated such that the calf supports are positioned for a patient to rest a portion of the patient's leg on the calf support during birthing labor.
Figure 20:
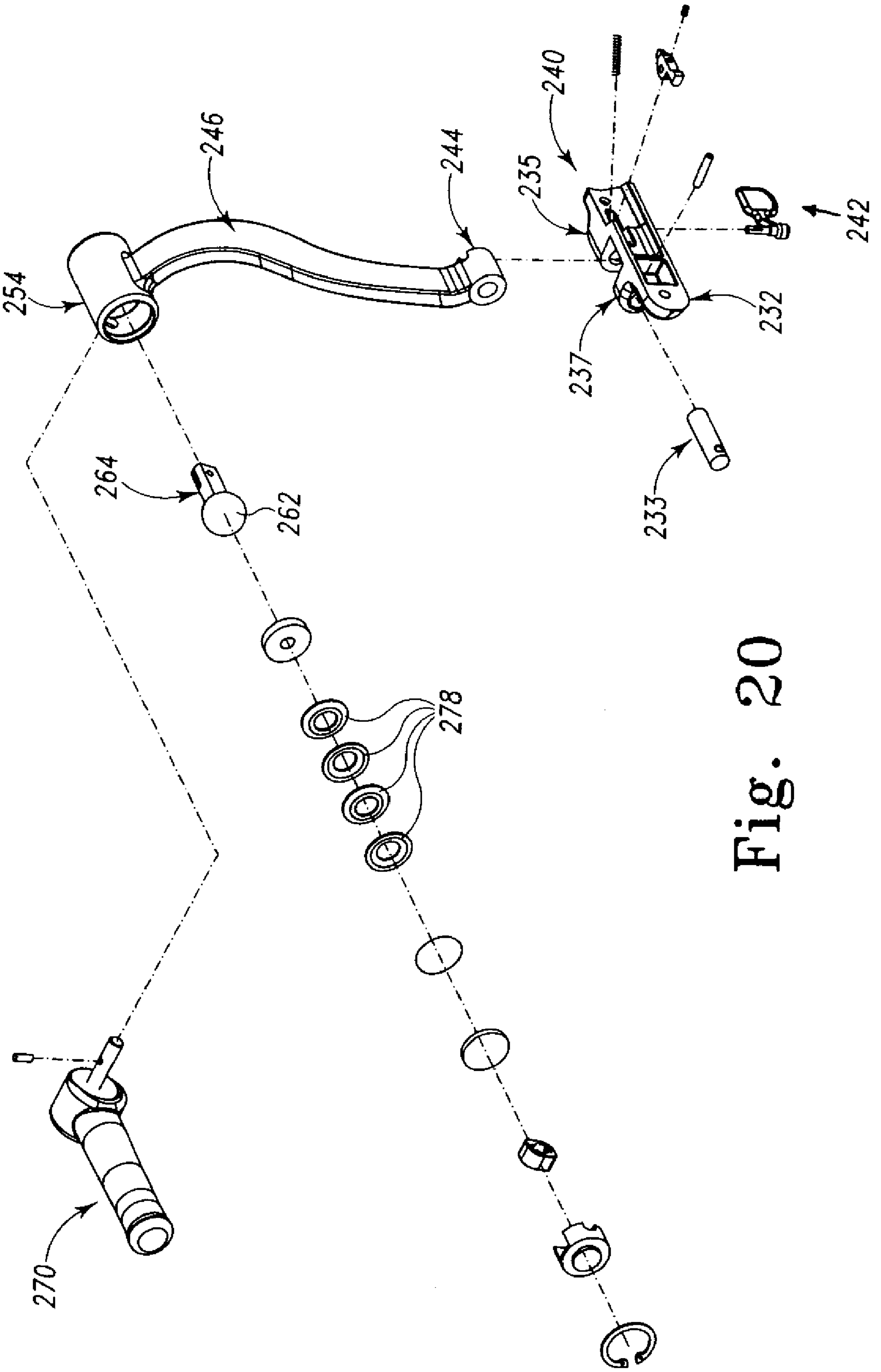
FIG. 20 is an exploded perspective view of illustrative components of the support arm and multi-axis pivot mount of FIGS. 15 and 16.

As shown in FIGS. 13 and 14, leg support 216 is pivotably coupled to foot support 12 through a pivot-coupler 232 that is coupled to foot support 16. The leg support 216 comprises an arm 234, a ball-lock assembly 236 coupled to the arm 234, and a cushion assembly 238 coupled to the ball-lock assembly 236. Referring now to FIG. 20, the pivot-coupler 232 includes a body 240 having a first knuckle 235, a second knuckle 237, and a spring-loaded release handle 242 coupled to the first knuckle 235. The pivot-coupler 232 also has an internal pivot shaft 233 about which arm 234 pivots.

Figure 15:
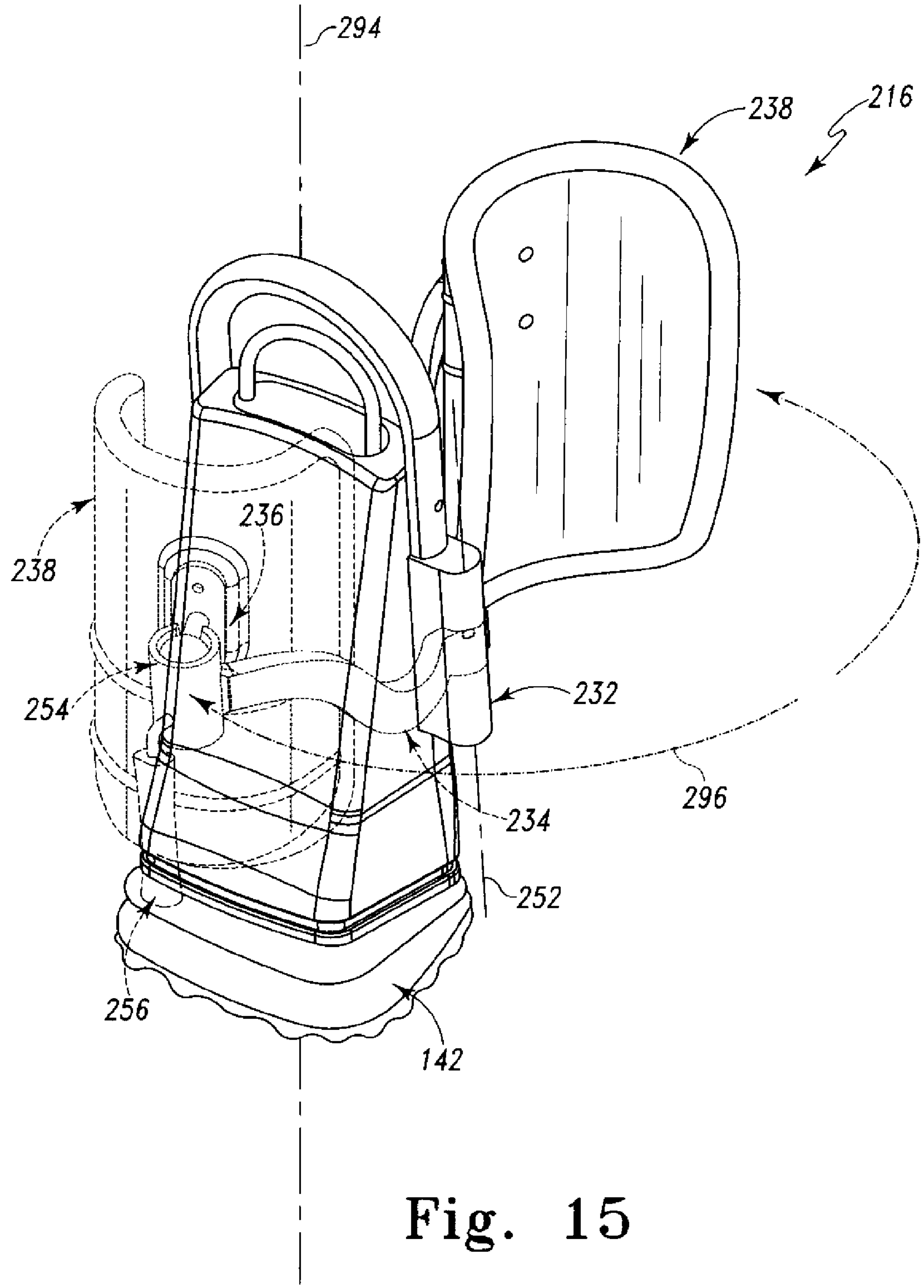
FIG. 15 is a perspective view of the calf support mounted to the foot support as shown in FIG. 13, the calf support shown articulated relative to the foot support and the calf support in a stowed position in phantom.
Figure 17:
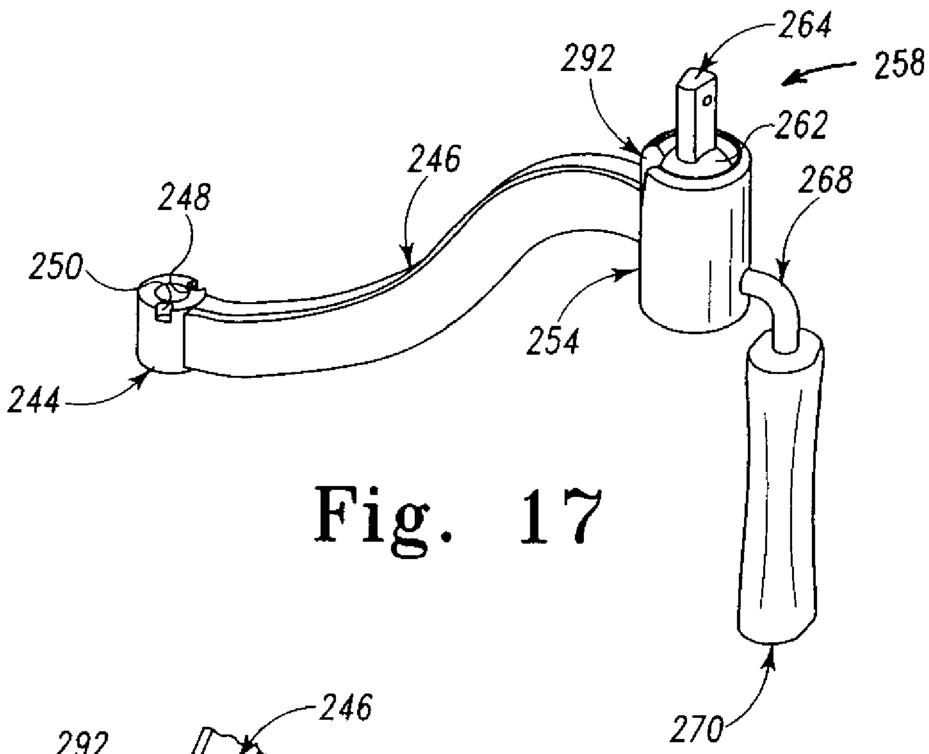
FIG. 17 is a perspective view of a support arm and multi-axis pivot mount of a calf support of the illustrative embodiment of FIG. 12.

The arm 234 is shown in FIG. 17 and comprises a pivot collar 244, an offset shaft 246, a first end 243, and a second end 245. The pivot collar 244 comprises two slots 248 and 250 which receive a lock-rod (not shown) coupled to the spring-loaded release handle 242 to maintain the arm 234 in a position in either a stowed position or a use position. The arm 234 and therefore leg support 216 pivots about an axis 252 shown in FIG. 15.

Figure 18:
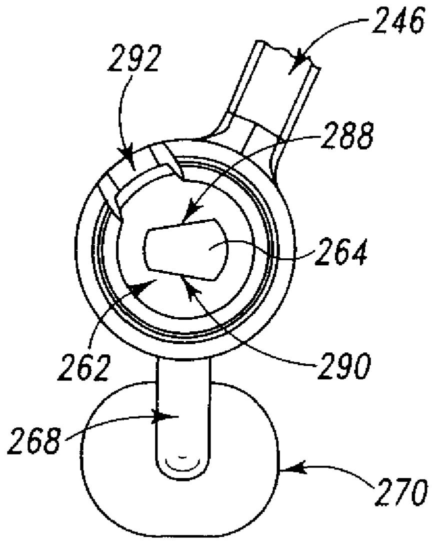
FIG. 18 is a top view of the multi-axis pivot mount and a portion of the support arm of FIG. 17.
Figure 19:
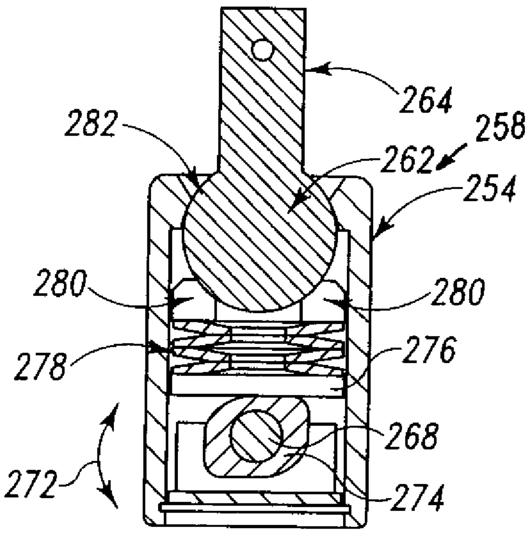
FIG. 19 is a sectional view of the multi-axis pivot mount of FIG. 18 taken along lines 19-19.
Figure 21:
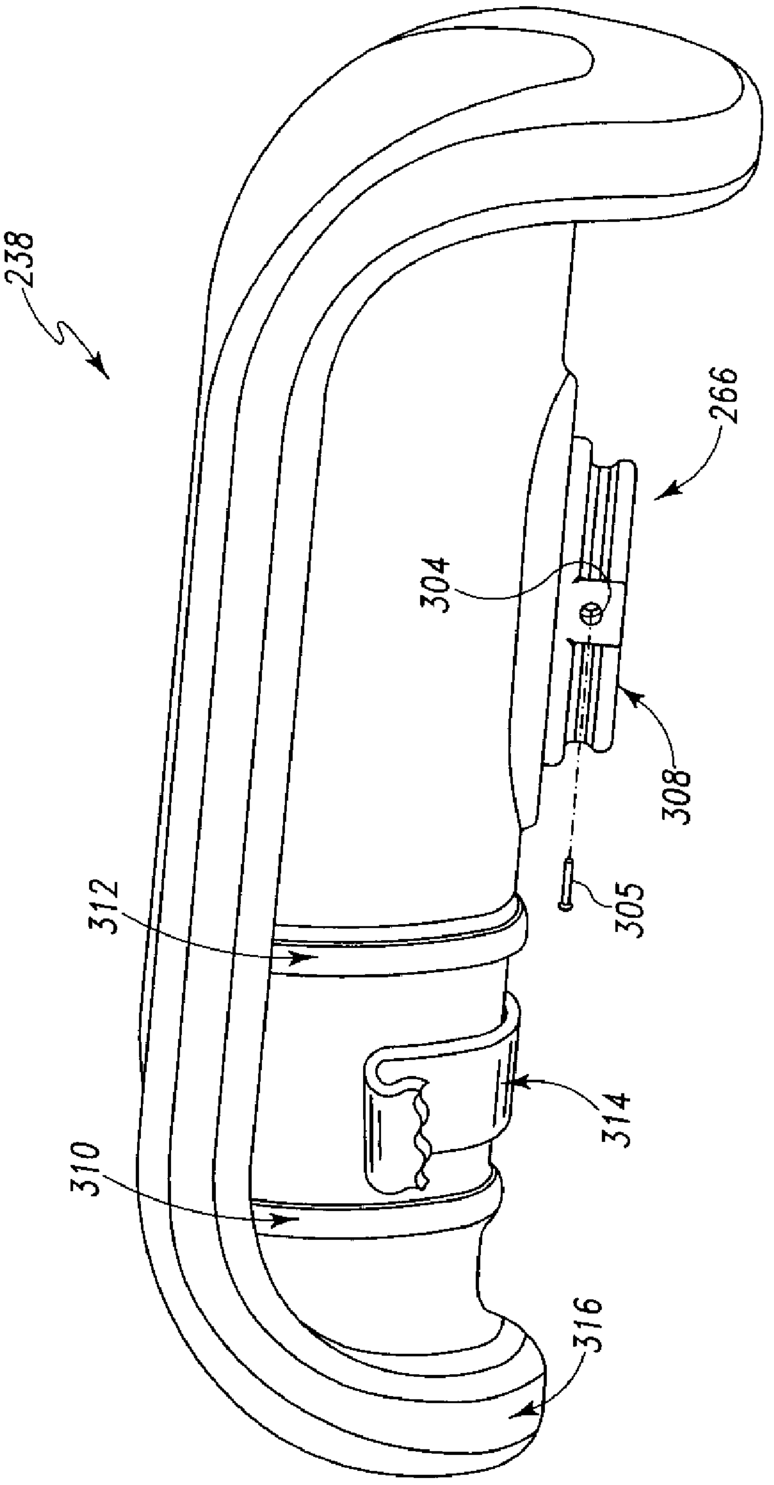
FIG. 21 is a perspective view of a cushion assembly of the calf support of FIG. 14.
Figure 22:
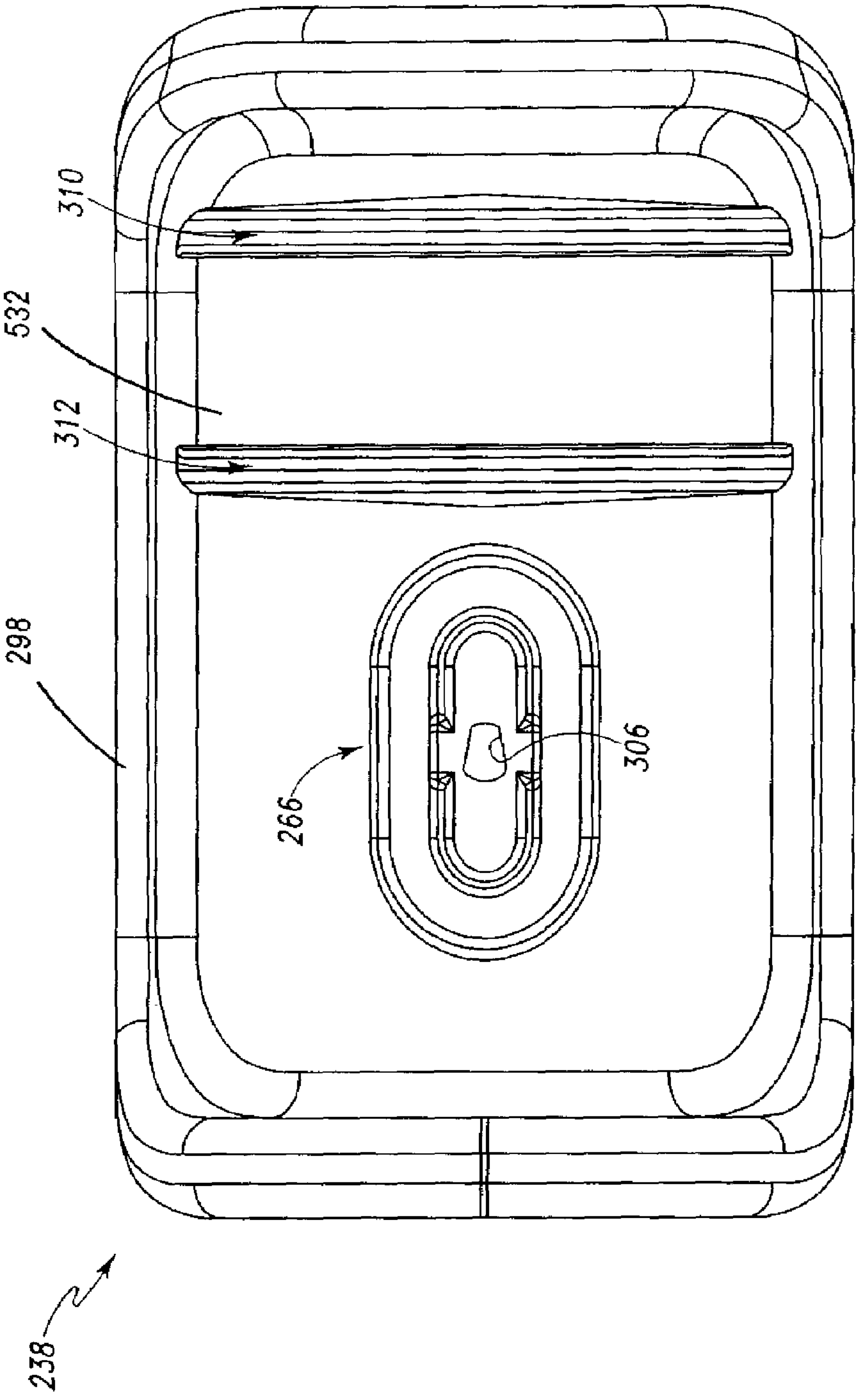
FIG. 22 is a bottom view of the cushion assembly of FIG. 21.

Details of the ball-lock mechanism 236 are shown in FIGS. 18 and 19 and the ball-lock mechanism 236 comprises a housing 254, an handle assembly 256, a ball mount 258, and a spring bias assembly 260. The ball-lock mechanism 236 is moveable between a position wherein the ball mount 258 is free to pivot relative to the housing 254 and position wherein ball mount 258 is constrained from moving relative to the housing 254. The ball mount 258 comprises a spherical portion 262 and a shaft 264 configured to engage with a mount 266 (best seen in FIG. 21) of the cushion assembly 238. The handle assembly 256 is used to engage the ball-lock mechanism 236.

The handle assembly 256 comprises a bent shaft 268 and a grip 270. The handle assembly 256 is actuated such that the shaft 268 is rotated in the direction of arrow 272 to thereby move the ball-lock mechanism 236 between locked and unlocked positions. Referring now to FIG. 19, shaft 268 is coupled to a cam 274 that supports a flange 276 of the spring bias assembly 260. The flange 276 supports four spring washers 278 that in turn support a cradle 280 that supports the spherical portion 262 of ball mount 258. The cam 274 is four sided with two opposing sides having a thickness smaller than the other two opposing sides. Thus, rotation of the cam 274 ninety degrees in the direction of arrow 272 changes the displacement of flange 276 and therefore the deflection of spring washers 278. As shown in FIG. 19, the displacement of spring washers 278 is at a minimum. In the position of FIG. 19, the force exerted by spring washers 278 on cradle 280 and therefore ball mount 258 is minimal such that the ball mount 258 is pivotable in a plurality of directions about the center of the spherical portion 262. When the cam 274 is rotated ninety degrees, the cradle 280 is urged against the spherical portion 262 which is thereby urged against an annular surface 282 of the housing 254 such that the ball mount 258 is restrained from moving.

Figure 23:
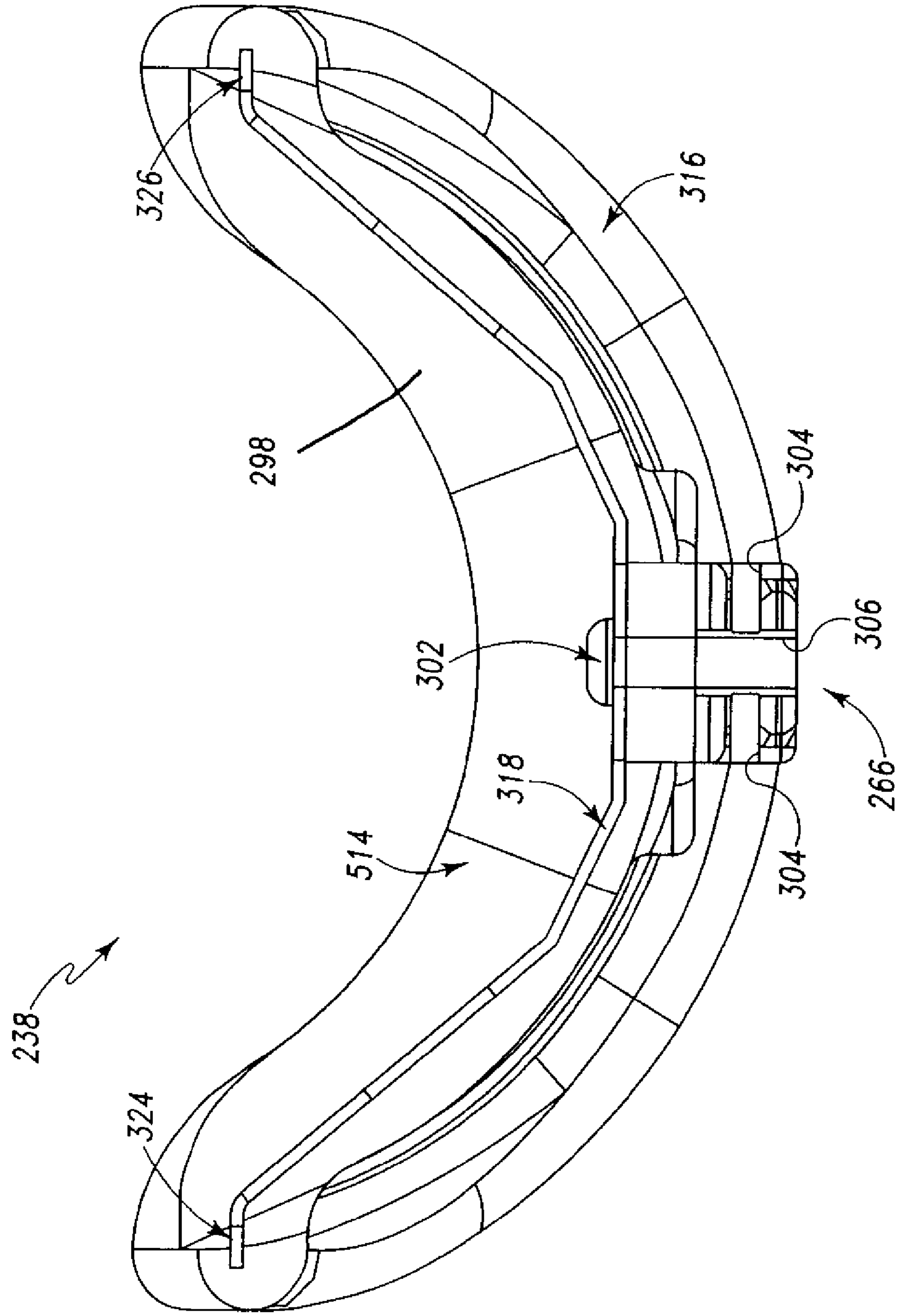
FIG. 23 is a cross-sectional view of the cushion assembly of FIG. 22 taken along lines 23-23.
Figure 24:
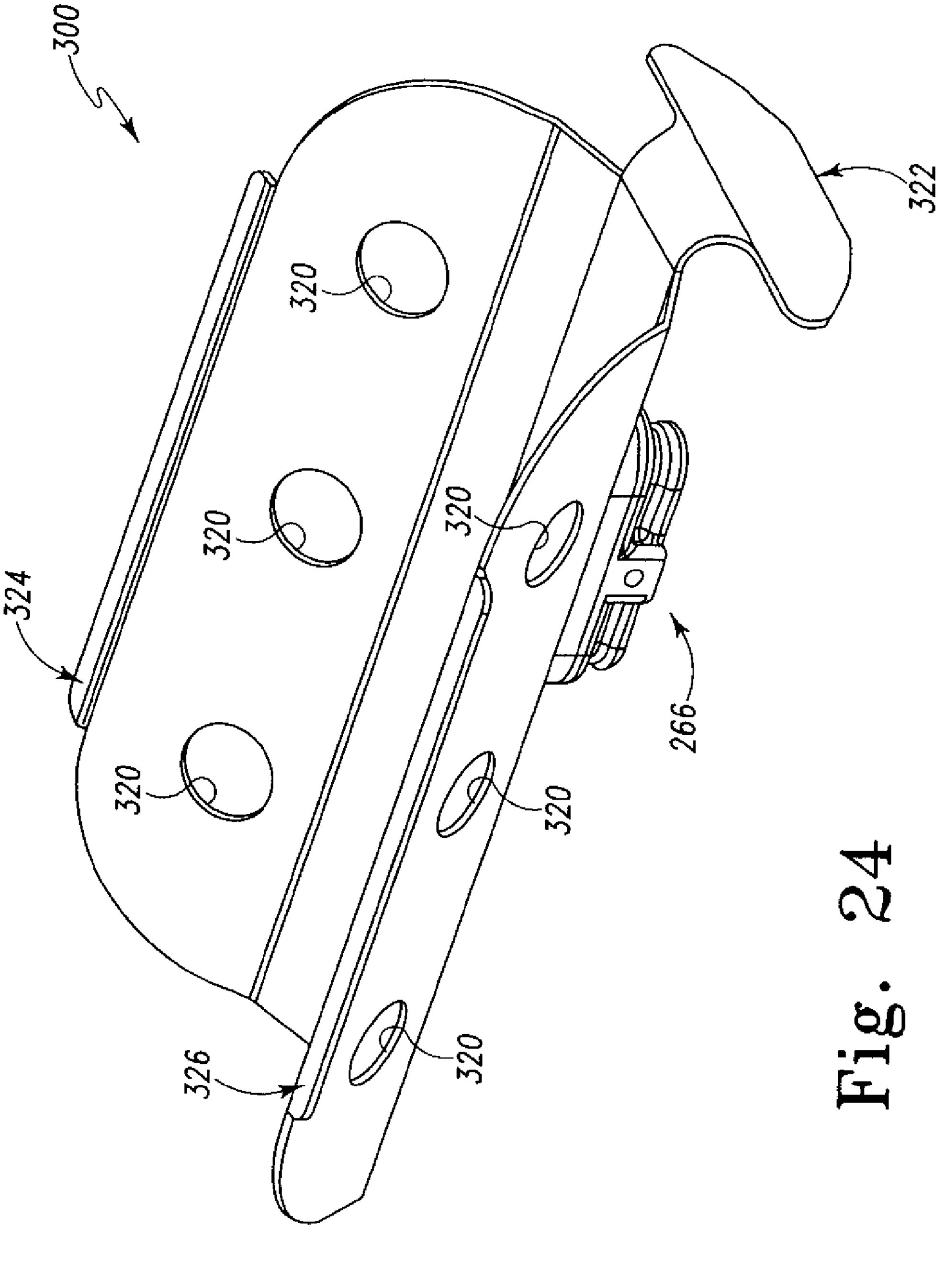
FIG. 24 is a perspective view of a mechanical insert of the cushion assembly of FIG. 22.

Referring now to FIG. 23, a portion of housing 254 is removed to define a slot 292 that is configured to receive the shaft 264 of ball mount 258 when the leg support 216 is in a stowed position. The shaft 264 has two sides 288 and 290 that define a tapered cross-section of shaft 264. The tapering assists the shaft in nesting in the slot 292 to prevent the cushion assembly 238 from moving while the leg support 216 is stowed.

Figure 16:
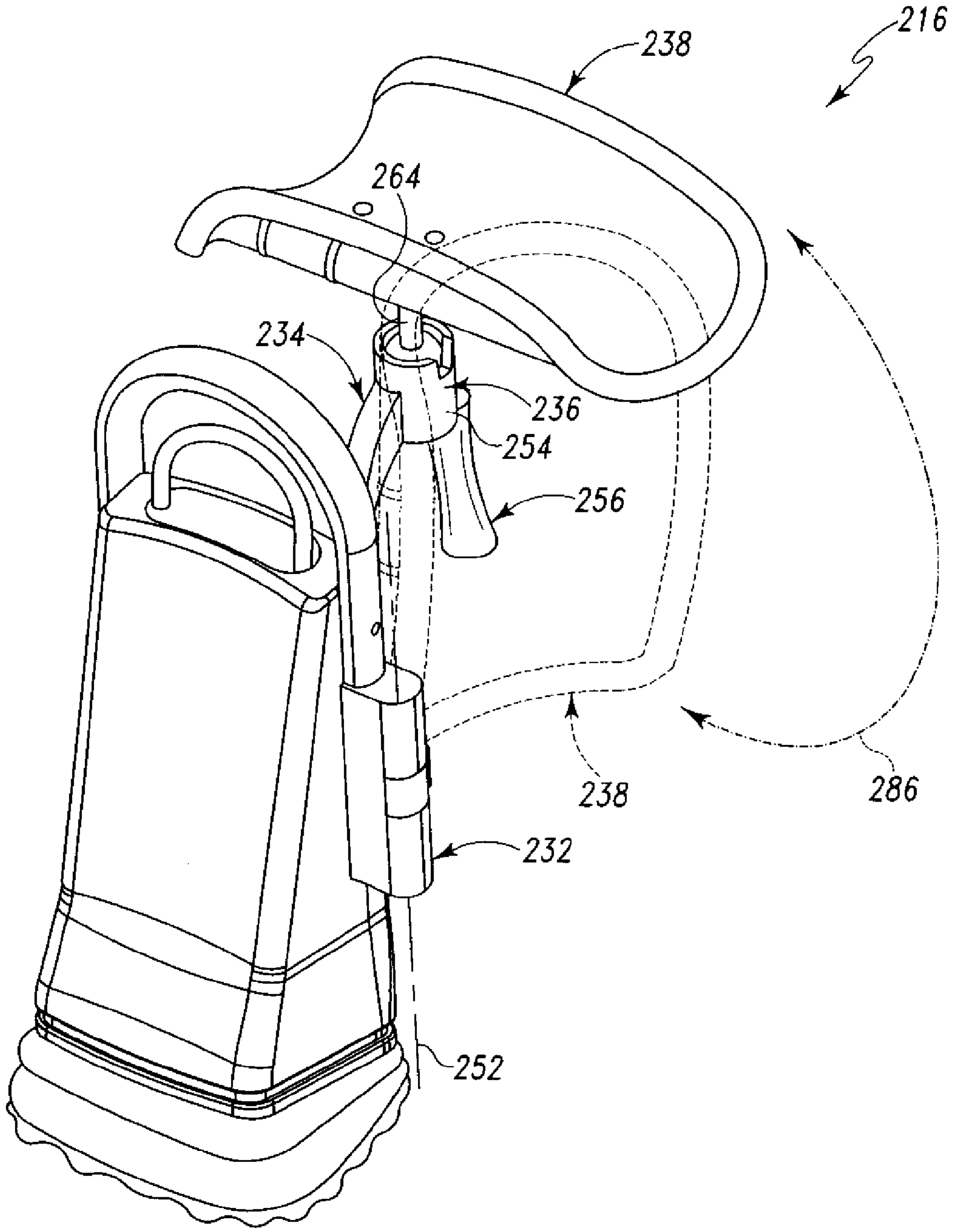
FIG. 16 is a perspective view similar to FIG. 15 with the calf support articulated about a multi-axis pivot mount relative to the foot support and an intermediate position in phantom.

The structure of leg support 216 permits the leg assembly to be rotated about an axis 294 shown in FIG. 20 in the direction of arrow 296. Once the leg support is rotated about axis 294, the cushion assembly 238 is positionable relative to the ball-lock mechanism 236 to a plurality of positions such as, for example, in direction 286 toward the use position shown in FIG. 16.

Referring now to FIGS. 21-24, the cushion assembly 238 comprises a molded foam covering 298 coupled to a support structure 300. The mount 266 is coupled to structure 300 through two fasteners 302. Mount 266 includes a through-hole 304 that is positioned such that when shaft 264 of ball mount 258 is positioned in a blind hole 306 in a lower surface 308 of mount 266, the cushion assembly 238 is coupled to the ball mount 258 and secured with a fastener 305.

The covering 298 is molded to form two ridges 310 and 312 in a surface 532 of covering 298. The ridges 310 and 312 are spaced apart such that a strap 314 is positionable between the ridges 310 and 312. Strap 314 is used as a securing strap to assist a patient in maintaining their legs positioned in the cushion assembly 238 during labor. The ridges 310 and 312 assist in maintaining the strap 314 positioned without sliding along the longitudinal length of the cushion assembly 238. Cushion assembly 238 further includes a molded ridge 316 that extends about the perimeter of the cushion assembly 238 to eliminate sharp edges. The covering 298 comprises an over-molded foam.

The covering 298 covers structure 300 that is a unitary metal sheet. In some embodiments, the metal sheet may be replaced with a rigid plastic material such as ABS. Structure 300 includes a main portion 318 that has several through-holes 320 that are configured to allow the over-molding to adhere between an upper portion and lower portion. Structure 300 also includes two flanges 324 and 326 extending longitudinally along a length of main portion 318. An additional flange 322 is coupled to main portion 318 to provide support for a lower leg hanging over the edge of cushion assembly 238.

The invention claimed is:

1. A lock release for a limb support of a patient-support apparatus, the lock release comprising a frame coupleable to the patient-support apparatus configured to pivot about a vertical axis and a horizontal axis in relation to the patient-support apparatus, the frame including a guide bracket having a pair of spaced-apart walls positioned in a parallel relation to one another, each wall formed to include a blind slot having a termination and an open end defining a plane of movement, and first and second pivot locks configured to block pivoting of the frame about the vertical and horizontal axes relative to the patient-support apparatus, a crossmember received by the slots for slidable movement therein allowing the crossmember to pivot about a plurality of axes perpendicular to the plane of movement, the crossmember being coupled to the first and second pivot locks, and a grip coupled to the crossmember and arranged for application of an actuation force thereto to unlock the first and second pivot locks, wherein the grip is configured to receive the actuation force at any point along the length of the grip parallel to the plane of movement to transmit the actuation force to the crossmember to thereby unlock the first and second pivot locks.

2. The lock release of claim 1, wherein the grip and the crossmember are integrally formed.

3. The lock release of claim 1, wherein the open end of each slot opens toward the grip.

4. The lock release of claim 1, wherein the crossmember is biased to engage the terminations of the slots.

5. The lock release of claim 1, wherein the crossmember is configured for movement upon application of the actuation force between a first release position where a portion of the crossmember maintains contact with a respective slot termination to establish a pivot point thereupon while an opposite end of the crossmember moves toward the open end of the slot to simultaneously unlock the first and second pivot locks, and a second release position where portions of the crossmember move generally symmetrically along the slots from the termination toward the open end to simultaneously unlock the first and second pivot locks.

6. The lock release of claim 1, wherein the grip is J-shaped and coupled on one end to the crossmember adjacent to one of the spaced-apart walls.

7. The lock release of claim 1, wherein the lock release further comprises a first cable coupled to the first lock and a second cable coupled to the second lock, and the crossmember is formed to include a pair of apertures, each aperture configured to receive an end of a cable.

8. The lock release of claim 1, wherein the first and second pivot locks include an outer housing coupled to the frame, a wrap spring positioned to engage the housing, a shaft extending through the wrap spring, and a first and a second flange positioned in a spaced-apart relation and coupled to opposing sides of the outer housing, the flanges coupled to the lock release.

9. The lock release of claim 8, wherein the flanges are configured to move toward one another in response to the actuation force being applied to cause an inner diameter of the wrap spring to enlarge so that the wrap spring is free to move along the shaft.

10. A lock release for a limb support of a patient-support apparatus, the lock release comprising a frame coupleable to the patient-support apparatus configured to pivot about a first axis and a second axis in relation to the patient-support apparatus, the frame including a guide bracket having a pair of spaced-apart walls positioned in a parallel relation to one another, each wall formed to include a slot defining a plane of movement, and a first axis pivot lock and a second axis pivot lock configured to block pivoting movement of the frame about the first and second axes in relation to the patient-support apparatus, a crossmember received by the slots and allowed to pivot about a plurality of axes perpendicular to the plane of movement, the crossmember being coupled to the first and second pivot locks, an actuator mounted to the frame, the actuator being coupled to the crossmember and configured to simultaneously release the first axis and second axis pivot locks in response to an application of an actuation force to allow pivotable movement of the frame in relation to the patient-support apparatus, and an actuator handle coupled to the actuator configured to transmit to the actuator an actuation force applied at any point along the length of the handle along the plane of movement to thereby release the first axis pivot lock and second axis pivot lock.

11. The lock release of claim 10, wherein the slots are blind slots having a termination and an open end.

12. The lock release of claim 11, wherein each slot open end opens toward the handle.

13. The lock release of claim 11, wherein the crossmember is received by the slots for slidable movement therein.

14. The lock release of claim 13, wherein the crossmember is configured for movement upon application of the actuation force between a first release position where a portion of the crossmember maintains contact with a respective slot termination to establish a pivot point thereupon while an opposite end of the crossmember moves toward the open end of the slot to simultaneously unlock the first and second axis pivot locks, and a second release position where portions of the crossmember move generally symmetrically along the slots from the termination toward the open end to simultaneously unlock the first and second axis pivot locks.

15. The lock release of claim 13, wherein the crossmember is biased to engage the terminations of the slots.

16. A lock release for use with a patient-support apparatus, the lock release comprising a foot support coupleable to the patient-support apparatus configured to pivot about first and second axes in relation to the patient-support apparatus, the foot support having a U-shaped guide bracket formed to include a pair of parallel spaced apart slots defining a plane of movement, each slot formed to include a termination and an open end, and a first and a second lock, to block pivoting of the foot support about the first and second axes in relation to the patient-support apparatus, a crossmember positioned in the slots for movement along the plane of movement relative to the guide bracket allowing the crossmember to pivot about a plurality of axes perpendicular to the plane of movement and further coupled to the first and second locks to simultaneously release the locks to allow pivoting of the foot support about the first and second axes in relation to the patient-support apparatus, and a release actuator coupled to the crossmember for receipt of an actuation force from a user, wherein the application of the actuation force moves the crossmember in relation to the guide bracket to simultaneously release the first and second locks, wherein the release actuator is configured to receive the actuation force at any point along the length of the release actuator parallel to the plane of movement to transmit the actuation force to the crossmember to thereby release the first and second locks.

17. The lock release of claim 16, wherein the crossmember is biased to engage the terminations of the slots.

18. The lock release of claim 16, wherein the crossmember is configured for movement upon application of the actuation force between a first release position where a portion of the crossmember maintains contact with a respective slot termination to establish a pivot point thereupon while an opposite end of the crossmember moves toward the open end of the slot to simultaneously unlock the first and second locks, and a second release position where portions of the crossmember move generally symmetrically along the slots from the termination toward the open end to simultaneously unlock the first and second locks.

19. The lock release of claim 18, wherein the first and second locks each include an outer housing coupled to the frame, a wrap spring positioned to engage the housing, a shaft extending through the wrap spring, and a first and a second flange positioned in a spaced-apart relation and coupled to opposing sides of the outer housing, the flanges coupled to the lock release.

* * * * *